(12) United States Patent
Lee

(10) Patent No.: US 12,147,248 B2
(45) Date of Patent: Nov. 19, 2024

(54) METHODS, SYSTEMS, AND DEVICES FOR INSPECTING STRUCTURES AND OBJECTS

(71) Applicant: MAXIS BROADBAND SDN. BHD., Kuala Lumpur (MY)

(72) Inventor: Boon Ong Lee, Kuala Lumpur (MY)

(73) Assignee: MAXIS BROADBAND SDN. BHD., Kuala Lumpur (MY)

( * ) Notice: Subject to any disclaimer, the term of this patent is extended or adjusted under 35 U.S.C. 154(b) by 0 days.

(21) Appl. No.: 18/003,109

(22) PCT Filed: Oct. 6, 2021

(86) PCT No.: PCT/MY2021/050084
§ 371 (c)(1),
(2) Date: Dec. 22, 2022

(87) PCT Pub. No.: WO2023/059178
PCT Pub. Date: Apr. 13, 2023

(65) Prior Publication Data
US 2024/0103537 A1     Mar. 28, 2024

(51) Int. Cl.
*G05D 1/00*     (2024.01)
*B64U 101/26*   (2023.01)
(Continued)

(52) U.S. Cl.
CPC ........... *G05D 1/106* (2019.05); *G05D 1/0094* (2013.01); *G06T 7/0002* (2013.01); *G06T 7/55* (2017.01);
(Continued)

(58) Field of Classification Search
CPC ........ G05D 1/106; G05D 1/0094; G06T 7/55; G06T 7/60; G06V 20/28; G06V 20/176
(Continued)

(56) References Cited

U.S. PATENT DOCUMENTS 10,340,983 B2 *  7/2019  Liu .................... H04B 3/46
11,029,211 B2 *  6/2021  Frank ................ G01J 5/061
(Continued)

FOREIGN PATENT DOCUMENTS

CN       111806686       10/2020
WO   WO 2020/189492     9/2020

OTHER PUBLICATIONS

International Search Report and Written Opinion for International Application No. PCT/MY2021/050084 (International Filing Date: Oct. 6, 2021), mailed Jan. 25, 2022, (6 pages).

*Primary Examiner* — Yazan A Soofi
(74) *Attorney, Agent, or Firm* — Christensen O'Connor Johnson Kindness PLLC

(57) ABSTRACT

Embodiments relate to methods, systems, and devices for performing an inspection on a telecommunication structure and/or one or more objects that are attached on the telecommunication structure. The system includes an unmanned aerial vehicle that includes one or more of the following: an image capturing subsystem, an object identifying subsystem, a distance measuring subsystem, a navigation subsystem, an electromagnetic interference subsystem, and an onboard processor that is in communication with the image capturing subsystem, the object identifying subsystem, the distance measuring subsystem, the navigation subsystem, the electromagnetic interference subsystem. The system also includes a control processor that is in communication with the onboard processor. Further, the control processor may also be the onboard processor on the unmanned aerial vehicle. The method includes configuring an unmanned aerial vehicle, receiving information pertaining to the telecommunication structure, generating a first flight path, communicating a command to control movements of the unmanned aerial vehicle along the first flight path, receiving information including a first electromagnetic interference (Continued)

signal, processing information including comparing the first electromagnetic interference signals with a threshold signal level, and generating a second flight path in response to a determination that the first electromagnetic interference signal is greater than or equal to the threshold signal level.

23 Claims, 4 Drawing Sheets

(51) Int. Cl.
*B64U 101/30* (2023.01)
*G06T 7/00* (2017.01)
*G06T 7/55* (2017.01)
*G06T 7/60* (2017.01)
*G06V 20/10* (2022.01)
*G06V 20/17* (2022.01)

(52) U.S. Cl.
CPC ............... *G06T 7/60* (2013.01); *G06V 20/17* (2022.01); *G06V 20/176* (2022.01); *B64U 2101/26* (2023.01); *B64U 2101/30* (2023.01); *B64U 2201/00* (2023.01); *G06T 2207/10016* (2013.01); *G06T 2207/10032* (2013.01); *G06T 2207/30184* (2013.01)

(58) Field of Classification Search
USPC .......................................................... 701/3
See application file for complete search history.

(56) References Cited

U.S. PATENT DOCUMENTS

2017/0336806 A1* 11/2017 Blanc-Paques ...... G01R 29/085
2018/0004207 A1* 1/2018 Michini ................. G01S 1/024
2019/0377345 A1* 12/2019 Bachrach ............... G06V 20/13
2019/0378423 A1* 12/2019 Bachrach ............... B64U 20/87
2021/0133996 A1* 5/2021 Zhou .................... G06T 7/0002

* cited by examiner

METHODS, SYSTEMS, AND DEVICES FOR INSPECTING STRUCTURES AND OBJECTS

CROSS-REFERENCES TO RELATED APPLICATIONS

This application is a National Stage of International Application No. PCT/MY2021/050084 filed Oct. 6, 2021, the disclosure of which is expressly incorporated by reference herein in its entirety.

TECHNICAL FIELD

The present disclosure relates generally to systems and methods for inspecting structures and/or objects, and more specifically, to systems and methods for performing an inspection of structures, objects and/or constructions using an unmanned aerial vehicle (UAV).

BACKGROUND

Outdoor structures and objects on these structures are damaged due to various reasons including being constantly exposed and subjected to various environmental factors, aging, malfunction, etc. Conventional methods of inspecting such outdoor structures and objects include performing observations via visual inspection by having field workers ascending these structures to visually search, inspect and analyze the damages or degradation of the structure.

BRIEF SUMMARY

When an inspection on a structure or objects, particularly objects that are attached to the structures, it is recognized in the present disclosure that several problems may arise when performing field inspection. As a non-limiting example, individuals and companies who are involved in inspection activities will generally need to invest significant amount of time and money in training and being certified themselves or their personnel to perform these inspections, purchase of safety gears and equipment and to ensure proper safety and standard operating procedures are adhered. As another example, these inspections rely on experienced field workers to expend substantial time and effort in performing inspection of structures manually. As another example, these field workers are required to physically inspect each area of the structures, objects and/or constructions and may at times miss certain areas, repairs required and/or conditions that requires attention. Further, this may also result in incomplete and inaccurate information on the condition or damage of the structure that may require revisit to obtain the correct information. In each of the aforementioned example situations (and any other situations, problems or issues which may arise, but not described, in the present disclosure), the inspection may not be done in a time efficient manner with lesser safety risk and the information or data obtained from the inspection may not be complete or represent the actual condition or integrity of the structure. As such, there is a need for an improved and safer process for structural inspection and at the same time, identify obvious errors or damage or provide accurate and detailed information, and being consistent in the inspection process on the health of the structures for further assessment and maintenance.

Present example embodiments relate generally to and/or include, among other things, systems, subsystems, processors, devices, logic, methods, and processes for addressing conventional problems, including those described above and in the present disclosure, and more specifically, example embodiments relate to systems, subsystems, processors, devices, logic, methods, and processes for performing inspections on structures and objects, particularly but not limited to, telecommunication structures and objects attached or secured on the telecommunication structure.

In an exemplary embodiment, a system for performing inspections on a telecommunication structure is described. The system includes an unmanned aerial vehicle. The unmanned aerial vehicle includes one or more of the following: an image capturing subsystem configured to capture images, a navigation subsystem configured to control movements of the unmanned aerial vehicle, an electromagnetic interference subsystem configured to detect electromagnetic interference signals; wherein when the electromagnetic interference subsystem detects one or more electromagnetic interference signals, the electromagnetic interference subsystem is configurable or configured to measure signal levels of the one or more electromagnetic interference signals, and an onboard processor that is in communication with the image capturing subsystem, the navigation subsystem, and the electromagnetic interference subsystem. The system also includes a control processor; the control processor is in communication with the onboard processor. Further, the control processor may also be the onboard processor on the unmanned aerial vehicle. The control processor is configurable or configured to communicate, to the navigation subsystem, a command for the navigation subsystem to control movements of the unmanned aerial vehicle from an initial start position along a first flight path, the first flight path including a first geolocation along the first flight path. The control processor is also configured to receive, in real-time, information from the onboard processor. The information is signal levels of one or more electromagnetic interference signals measured by the electromagnetic interference subsystem, including a first signal level of a first electromagnetic interference signal measured by the electromagnetic interference subsystem when the unmanned aerial vehicle is at the first geolocation. The control processor is also configured to process, in real-time, the information received from the onboard processor. The processing includes comparing the first signal level of the first electromagnetic interference signal with a threshold signal level. In response to a determination that the first signal level of the first electromagnetic interference signal is greater than or equal to the threshold signal level, the processing further includes generating a second flight path, the second flight path being an adjustment to the first flight path, including a repositioning of the unmanned aerial vehicle from the first geolocation to a second geolocation based on the first signal level of the first electromagnetic signal, the second geolocation being different from the first geolocation. The processing also includes communicating, to the navigation subsystem, a command for the navigation subsystem to reposition the unmanned aerial vehicle from the first geolocation to the second geolocation. At the second geolocation, the processing also includes receiving, in real-time from the onboard processor, a second signal level of the first electromagnetic interference signal measured by the electromagnetic interference subsystem when the unmanned aerial vehicle is at the second geolocation. The processing further includes comparing the second signal level of the first electromagnetic interference signal with the threshold signal level.

In another exemplary embodiment, a system for performing inspections on a telecommunication structure is described. The system includes an unmanned aerial vehicle.

The unmanned aerial vehicle includes one or more of the following: an image capturing subsystem configured to capture images, an object identifying subsystem configured to identify geometries of one or more objects in the images captured by the image capturing device, a distance measuring subsystem configured to measure distances between the unmanned aerial vehicle and the one or more objects in the images captured by the image capturing device, a navigation subsystem configured to control movements of the unmanned aerial vehicle, an electromagnetic interference subsystem configured to detect electromagnetic interference signals; wherein when the electromagnetic interference subsystem detects one or more electromagnetic interference signals, the electromagnetic interference subsystem is configured to measure signal levels of the one or more electromagnetic interference signals, and an onboard processor that is in communication with the image capturing subsystem, the object identifying subsystem, the distance measuring subsystem, the navigation subsystem, and the electromagnetic interference subsystem. The system also includes a control processor; the control processor in communication with the onboard processor. Further, the control processor may also be the onboard processor on the unmanned aerial vehicle. The control processor is configured or configurable to communicate, to the navigation subsystem, a command for the navigation subsystem to control movements of the unmanned aerial vehicle from an initial start position along a first flight path, the first flight path including a first geolocation along the first flight path. The control processor is also configured to receive, in real-time, information from the onboard processor. The information may include one or more of the following: images captured by the image capturing subsystem including a first image captured by the image capturing subsystem when the unmanned aerial vehicle is at the first geolocation; the first image including an image of a first portion of the telecommunication structure, geometries of one or more objects identified by the object identifying subsystem, including a first geometry of a first object identified by the object identifying subsystem when the unmanned aerial vehicle is positioned at the first geolocation; distances measured by the distance measuring subsystem including a first distance between the unmanned aerial vehicle and the first object when the unmanned aerial vehicle is at the first geolocation, and signal levels of one or more electromagnetic interference signals measured by the electromagnetic interference subsystem including a first signal level of a first electromagnetic interference signal measured by the electromagnetic interference subsystem when the unmanned aerial vehicle is at the first geolocation. The control processor is also configurable or configured to process, in real-time, the information received from the onboard processor. The processing includes comparing the first signal level of the first electromagnetic interference signal with a threshold signal level. In response to a determination that the first signal level of the first electromagnetic interference signal is greater than or equal to the threshold signal level, the processing further includes generating a second flight path, the second flight path being an adjustment to the first flight path, including a repositioning of the unmanned aerial vehicle from the first geolocation to a second geolocation based on the first signal level of the first electromagnetic signal, the second geolocation being different from the first geolocation. The processing also includes communicating, to the navigation subsystem, a command for the navigation subsystem to reposition the unmanned aerial vehicle from the first geolocation to the second geolocation. At the second geolocation, the processing also includes receiving, in real-time from the onboard processor, one or more of the following information: a second image captured by the image capturing subsystem when the unmanned aerial vehicle is at the second geolocation; the second image including an image of the first portion of the telecommunication structure, a second geometry of the first object identified by the object identifying subsystem when the unmanned aerial vehicle is positioned at the second geolocation, a second distance between the unmanned aerial vehicle and the first object identified by the object identifying subsystem when the unmanned aerial vehicle is at the second geolocation, and a second signal level of the first electromagnetic interference signal measured by the electromagnetic interference subsystem when the unmanned aerial vehicle is at the second geolocation. The process further includes comparing the second signal level of the first electromagnetic interference signal with the threshold signal level.

In an exemplary embodiment, a method for performing inspections on a telecommunication structure is described. The method includes configuring an unmanned aerial vehicle. The unmanned aerial vehicle includes an image capturing subsystem. The image capturing subsystem is configurable or configured to capture images of the telecommunication structure. The unmanned aerial vehicle includes a navigation subsystem. The navigation subsystem is configurable or configured to control movements of the unmanned aerial vehicle. The unmanned aerial vehicle also includes an electromagnetic interference subsystem. The electromagnetic interference subsystem is configurable or configured to detect electromagnetic interference signals. The electromagnetic interference subsystem detects one or more electromagnetic interference signals; and is configurable or configured to measure signal levels of the one or more electromagnetic interference signals. The method also further includes receiving, by a control processor, information pertaining to the telecommunication structure being inspected. The method further includes generating, by the control processor, a first flight path, the first flight path generated based on the received information pertaining to the telecommunication structure. The method includes communicating, to the navigation subsystem, a command for the navigation subsystem to control movements of the unmanned aerial vehicle from an initial start position along the first flight path, the first flight path including a first geolocation along the first flight path. The method further includes receiving, in real-time, information from the unmanned aerial vehicle. The information may include measurements of signal levels of one or more electromagnetic interference signals measured by the electromagnetic interference subsystem, including a first signal level of a first electromagnetic interference signal measured by the electromagnetic interference subsystem when the unmanned aerial vehicle is at the first geolocation. The method includes processing, in real-time, the information received from the unmanned aerial vehicle. The processing includes comparing the first signal level of the first electromagnetic interference signal with a threshold signal level. In response to a determination that the first signal level of the first electromagnetic interference signal is greater than or equal to the threshold signal level, the method further includes generating a second flight path; the second flight path being an adjustment to the first flight path including a repositioning of the unmanned aerial vehicle from the first geolocation to a second geolocation based on the first signal level of the first electromagnetic signal; the second geolocation being different from the first geolocation. The response also includes communicating, to the navigation subsystem, a command for the navigation subsystem to reposition the unmanned aerial vehicle from the first geolocation to the second geolocation. The response includes receiving, in real-time, information from the onboard processor. The information from the onboard processor is a second signal level of the first electromagnetic interference signal measured by the electromagnetic interference subsystem when the unmanned aerial vehicle is at the second geolocation. The response further includes comparing the second signal level of the first electromagnetic interference signal with the threshold signal level.

Various terms used herein have special meanings within the present technical field. Whether a particular term should be construed as such a "term of art" depends on the context in which that term is used. Such terms are to be construed in light of the context in which they are used in the present disclosure and as one of ordinary skill in the art would understand those terms in the disclosed context. The above definitions are not exclusive of other meanings that might be imparted to those terms based on the disclosed context.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

BRIEF DESCRIPTION OF THE FIGURES

For a more complete understanding of the present disclosure, example embodiments, and their advantages, reference is now made to the following description taken in conjunction with the accompanying figures, in which like reference numbers indicate like features, and.

Figure 1:
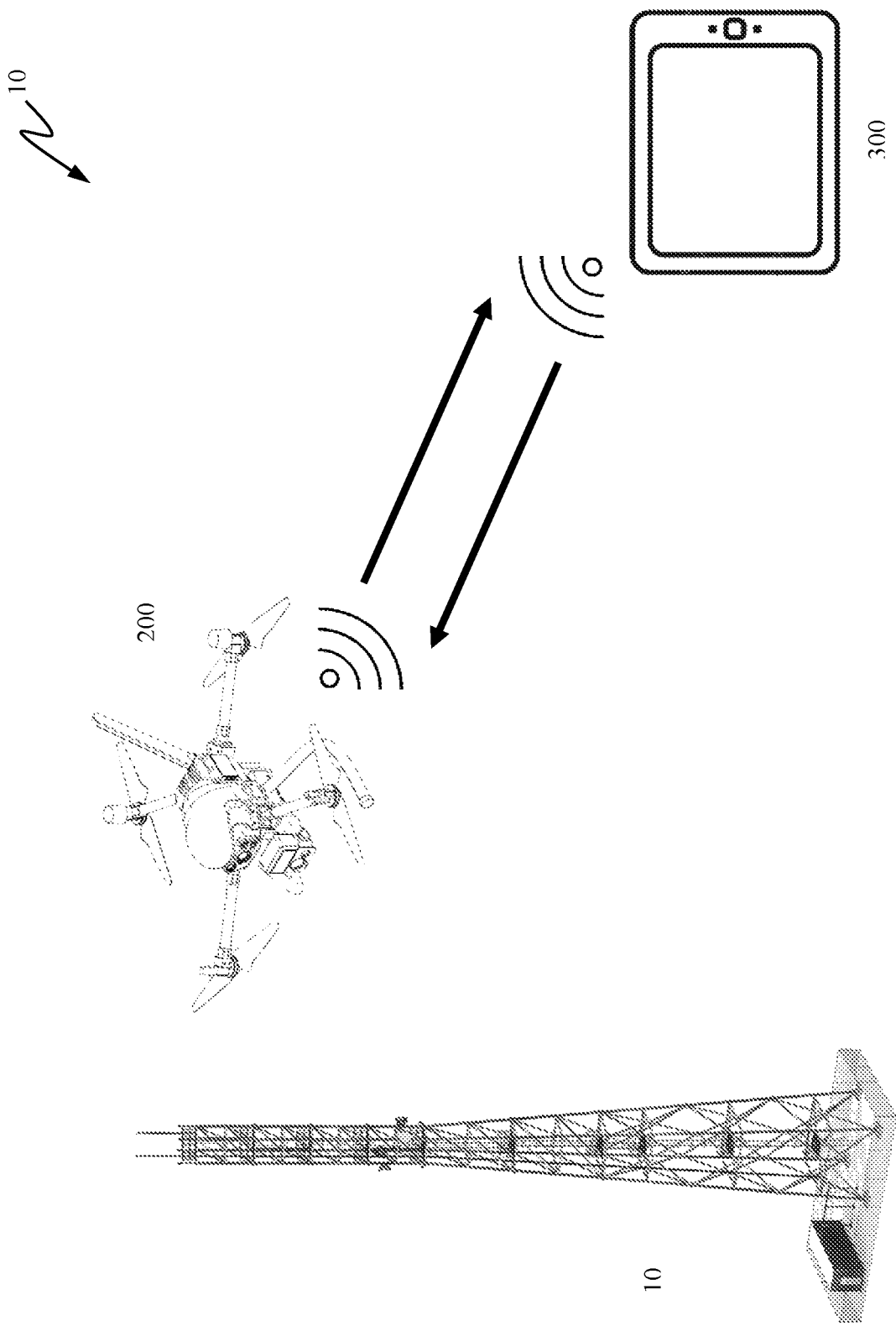
FIG. 1 is an illustration of an example embodiment of a system for performing inspections on a telecommunication structure.

Although similar reference numbers may be used to refer to similar elements in the figures for convenience, it can be appreciated that each of the various example embodiments may be considered distinct variations. Example embodiments will now be described with reference to the accompanying figures, which form a part of the present disclosure and which illustrate example embodiments which may be practiced. As used in the present disclosure and the appended claims, the terms "embodiment", "example embodiment", "exemplary embodiment", and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on", and the terms "a", "an", and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon", depending on the context. Furthermore, as used in the present disclosure and the appended claims, the words "and/or" may refer to and encompass any and all possible combinations of one or more of the associated listed items.

DETAILED DESCRIPTION

Present example embodiments relate generally to and/or include systems, subsystems, processors, devices, logic, methods, and processes for addressing conventional problems, including those described above and in the present disclosure, and more specifically, example embodiments relate to systems, subsystems, processors, devices, logic, methods, and processes for performing inspections of structures and objects attached or secured to structures.

As a non-limiting example, present example embodiments are directed to systems and methods for inspecting telecommunication structures and objects attached to, associated with, and/or secured to telecommunication structures. As used in the present disclosure, the terms "inspection" or "inspect" as it relates to an object or structure may include, but is not limited to, performing of checks, examinations, observations, surveillance, investigations, evaluations, explorations, determination, reviews, image capturing (including still images and/or video images), image processing, size/dimension estimation and/or determination, distance estimation and determination, position and/or geolocation estimation and/or determination, orientation estimation and determination, status determination (e.g., determination of abnormalities, defects, damage, corrosion/rust, absence, presence, discoloration, unexpected additions (e.g., man-made additions such as transceivers, monitoring devices, etc.; naturally occurring additions such as mold, plastic bags, bird nests, etc., etc.), and/or the like, of structures and/or objects attached to, associated with, and/or secured to structures.

For example, example embodiments are directed to configuring an unmanned aerial vehicle (or UAV) to perform inspections. The configuring according to example embodiments may include configuring an image capturing subsystem of the unmanned aerial vehicle to capture images (e.g., still images and/or video images) of a structure and/or object that needs to be inspected (e.g., a telecommunication structure and/or one or more objects attached, associated, and/or secured to a telecommunication structure). The image capturing subsystem may include a camera, a digital camera, a video camera, etc. The configuring according to example embodiments may also include configuring an object identifying subsystem to identify objects, portions of objects (e.g., parts of a telecommunication structure), and/or geometries of objects in the images captured by the image capturing device. The configuring according to example embodiments may also include configuring a distance measuring subsystem to measure one or more distances, including distances between the unmanned aerial vehicle and one or more objects (and/or portions of objects) in the images captured by the image capturing subsystem. The configuring according to example embodiments may also include configuring a navigation subsystem to control movements of the unmanned aerial vehicle and navigate the unmanned aerial vehicle from one position (or location, geolocation, and/or orientation) to another position (or another location, geolocation, and/or orientation). The configuring according to example embodiments may also include configuring an electromagnetic interference subsystem to detect, identify, and/or measure one or more electromagnetic signals (referred to herein as "electromagnetic signals", "electromagnetic interference signals", "interference signals", "wireless signals", "signals", or the like). For example, the electromagnetic interference subsystem may be configurable or configured to detect one or more electromagnetic interference signals, identify a source (or direction of origin) of the one or more electromagnetic signals, and measure signal levels of the one or more electromagnetic interference signals.

Example embodiments are also directed to configuring a control processor to communicate with, process information from, and/or send instructions to the unmanned aerial vehicle. For example, the control processor may be configured to receive information pertaining to the structure being inspected. The configuring according to example embodiments may also include configuring the control processor to generate a first flight path for the unmanned aerial vehicle. The first flight path may be generated based on, among other things, the received information pertaining to the structure being inspected. Such information may include geolocation-related information, reference position information, environmental information, historic information, etc. The configuring according to example embodiments may also include configuring the control processor to communicate, to the navigation subsystem of the unmanned aerial vehicle, a command for the navigation subsystem to control movements of the unmanned aerial vehicle from an initial start position (or location, geolocation, or orientation) along the first flight path. The configuring according to example embodiments may also include configuring the control processor to receive information from the unmanned aerial vehicle. Such receiving may be in real-time or near real-time. Such received information may include measurements of signal levels of one or more electromagnetic signals measured by the electromagnetic interference subsystem. Such measured signal levels may include a first signal level of a first electromagnetic interference signal measured by the electromagnetic interference subsystem when the unmanned aerial vehicle is at a first geolocation along the first flight path. The configuring according to example embodiments may also include configuring the control processor to process the information received from the unmanned aerial vehicle. Such processing may be in real-time or near real-time. Such processing may include comparing the first signal level of the first electromagnetic interference signal with a threshold signal level. The processing may also include performing several further processing when the first signal level of the first electromagnetic interference signal is greater than or equal to a threshold signal level. Such further processing may include generating a second flight path by adjusting the first flight path. Such adjusting may include repositioning the unmanned aerial vehicle from the first geolocation to a second geolocation based on the first signal level of the first electromagnetic signal (the second geolocation being different from the first geolocation). The further processing may also include communicating, to the navigation subsystem of the unmanned aerial vehicle, a command for the navigation subsystem to reposition the unmanned aerial vehicle from the first geolocation to the second geolocation. The further processing may also include receiving, from the onboard processor of the unmanned aerial vehicle, a second signal level of the first electromagnetic interference signal measured by the electromagnetic interference subsystem when the unmanned aerial vehicle is at the second geolocation. The further processing may also include comparing the second signal level of the first electromagnetic interference signal with the threshold signal level.

Example embodiments are also directed to a system for inspecting structures and/or objects. The system includes one or more unmanned aerial vehicles and one or more control processors. Although example embodiments described in the present disclosure are directed to control processors being separate elements from the unmanned aerial vehicles, it is to be understood that one or more actions, functions, and/or processing of the control processor may also be performed by and/or in cooperation with one or more elements of the unmanned aerial vehicle, and vice versa.

As will be further described in the present disclosure, example embodiments of the unmanned aerial vehicle include one or more elements. For example, the unmanned aerial vehicle may include an image capturing subsystem for capturing images (e.g., still images and/or video images) of a structure and/or object that needs to be inspected (e.g., a telecommunication structure and/or one or more objects attached, associated, and/or secured to a telecommunication structure). The image capturing subsystem may include a camera, a digital camera, a video camera, etc. The unmanned aerial vehicle may also include an object identifying subsystem configurable or configured to identify objects, portions of objects (e.g., parts of a telecommunication structure), and/or geometries of objects in the images captured by the image capturing device. The unmanned aerial vehicle may also include a distance measuring subsystem configurable or configured to measure one or more distances, including distances between the unmanned aerial vehicle and one or more objects (and/or portions of objects) in the images captured by the image capturing subsystem. The unmanned aerial vehicle may also include a navigation subsystem configurable or configured to control movements of the unmanned aerial vehicle and navigate the unmanned aerial vehicle from one position (or location, geolocation, and/or orientation) to another position (or another location, geolocation, and/or orientation). The unmanned aerial vehicle may also include an electromagnetic interference subsystem configurable or configured to detect, identify, and/or measure one or more electromagnetic signals. For example, the electromagnetic interference subsystem may be configurable or configured to detect one or more electromagnetic interference signals, identify a source (or direction of origin) of the one or more electromagnetic signals, and measure signal levels of the one or more electromagnetic interference signals.

Example embodiments of the control processor may be in communication with the onboard processor of the unmanned aerial vehicle. The control processor is configurable or configured to communicate a command for the navigation subsystem to control movements of the unmanned aerial vehicle from an initial start position along a first flight path. The first flight path includes a first geolocation that is along the first flight path. The control processor is configurable or configured to receive real-time or near real-time information from the onboard processor. Such real-time (or near real-time) information may include, but is not limited to, images captured by the image capturing subsystem, geometries of one or more objects identified by the object identifying subsystem, distances measured by the distance measuring subsystem, and/or signal levels of one or more electromagnetic signals measured by the electromagnetic interference subsystem.

The control processor is further configurable or configured to process a first signal level of one or more electromagnetic interference signals measured by the electromagnetic interference subsystem at the first geolocation and compare the first signal level of the first electromagnetic interference signal with a threshold signal level. The control processor is further configurable or configured to perform further processing when the control processor determines that the first signal level of the first electromagnetic interference signal is greater than or equal to the threshold signal level. Such further processing may include generating a second flight path. The second flight path may be an adjustment in response to the determination that the first signal level of the first electromagnetic interference signal is greater than or equal to the threshold signal level. The adjustment includes repositioning of the unmanned aerial vehicle from the first geolocation to a second geolocation (wherein the second geolocation is different from the first geolocation). The information on the second flight path is then communicated to the navigation subsystem to reposition the unmanned aerial vehicle from the first geolocation to the second geolocation.

Upon repositioning the unmanned aerial vehicle, the control processor is configurable or configured to receive real-time or near real-time information from the onboard processor from the second geolocation. Such real-time (or near real-time) information from the second geolocation may include, but is not limited to, images captured by the image capturing subsystem, geometries of one or more objects identified by the object identifying subsystem, distances measured by the distance measuring subsystem, and/or signal levels of one or more electromagnetic interference signals measured by the electromagnetic interference subsystem. The control processor is further configurable or configured to process the second signal level of the first electromagnetic interference signal with a threshold signal level.

The control processor is further configurable or configured to perform further processing when the control processor determines that the second signal level of the first electromagnetic interference signal at the second geolocation is greater than or equal to a threshold signal level. Such further processing may include generating a separate (e.g., third, etc.) flight path. The separate flight path may be an adjustment in response to the determination that the second first signal level of the first electromagnetic interference signal at the second geolocation is greater than or equal to the threshold signal level. The adjustment includes repositioning of the unmanned aerial vehicle from the second geolocation to a third geolocation (wherein the third geolocation is different from the second geolocation). The information on the third flight path is then communicated to the navigation subsystem to reposition the unmanned aerial vehicle from the second geolocation to the third geolocation.

Upon repositioning the unmanned aerial vehicle, the control processor is configurable or configured to receive real-time information from the onboard processor from the third geolocation. Such real-time information from the third geolocation may include, but is not limited to, images captured by the image capturing subsystem, geometries of one or more objects identified by the object identifying subsystem, distances measured by the distance measuring subsystem, and/or signal levels of one or more electromagnetic interference signals measured by the electromagnetic interference subsystem. The control processor is further configurable or configured to process a third signal level of the first electromagnetic interference signal at the third geolocation with a threshold signal level. The control processor is further configurable or configured to perform further processing in a similar manner as described above for the second signal level, including generating further separate flight paths (e.g., fourth flight path, fifth flight path, etc.), communicating information on the further flight paths to the navigation subsystem, etc.

Additionally, the control processor is configurable or configured to process a first signal level of a second electromagnetic interference signal measured by the electromagnetic interference subsystem at the first geolocation and compare the first signal level of the second electromagnetic interference signal with a threshold signal level. The control processor is further configurable or configured to perform further processing when the control processor determines that the first signal level of the second electromagnetic interference signal is greater than or equal to the threshold signal level. Such further processing may include generating a separate (e.g., third, fourth, etc.) flight path. The separate flight path may be an adjustment in response to the determination that the first signal level of the second electromagnetic interference signal is greater than or equal to the threshold signal level. The adjustment includes repositioning of the unmanned aerial vehicle from the first geolocation to a fourth geolocation (wherein the fourth geolocation is different from the first geolocation). The information on the separate flight path is then communicated to the navigation subsystem to reposition the unmanned aerial vehicle from the first geolocation to the fourth geolocation.

Upon repositioning the unmanned aerial vehicle, the control processor is configurable or configured to receive real-time information from the onboard processor from the fourth geolocation. Such real-time information from the fourth geolocation may include, but is not limited to, images captured by the image capturing subsystem, geometries of one or more objects identified by the object identifying subsystem, distances measured by the distance measuring subsystem, and/or signal levels of one or more electromagnetic interference signals measured by the electromagnetic interference subsystem. The control processor is further configurable or configured to process a second signal level of the second electromagnetic interference signal with a threshold signal level.

Example embodiments are configurable or configured to receive, obtain, and/or generate information pertaining to the structure that is being inspected. Such information may include but are not limited to the following: images of the structure; geometries of the objects identified on the structure, distances between the objects identified and the unmanned aerial vehicle, and signal levels of the electromagnetic interference signals at the various geolocations. Information may also include, but are not limited to, information pertaining to portions or parts of the telecommunication structure, objects attached to, associated with, and/or secured to the telecommunication structure, dimensions of the telecommunication structure, location of source(s) of the electromagnetic interference signals, direction of the electromagnetic interference signals, the different axes of the telecommunication structure, sections and/or levels of the telecommunication structure, historic information of previous inspections of the telecommunication structure, and points of interest of the telecommunication structure.

It is to be understood in the present disclosure that one or more elements, actions, and/or aspects of example embodiments may include and/or implement, in part or in whole, solely and/or in cooperation with other elements, using, for example, networking technologies, cloud computing, distributed ledger technology (DLT) (e.g., blockchain), artificial intelligence (AI), machine learning, deep learning, etc. Furthermore, although example embodiments described in the present disclosure may be directed to the inspection of telecommunication structure, it is to be understood in the present disclosure that example embodiments may also be directed to the inspection of other types or forms of structures without departing from the teachings of the present disclosure. For example, present example embodiments may also be directed to inspection of buildings, bridges, infrastructures such as offshore/onshore platforms and power transmission towers.

Example embodiments will now be described below with reference to the accompanying figures, which form a part of the present disclosure.

Example Embodiments of a System for Inspecting a Telecommunication Structure (e.g., System 100).

FIG. 1 illustrates an example embodiment of a system (e.g., system 100) for inspecting telecommunication structures 10, parts 10 or portions 10 of telecommunication structures 10, and/or objects 10 attached to, associated with, and/or secured to the telecommunication structure 10 (and/or parts 10 or portions 10 of telecommunication structures 10 and/or objects 10 attached to, associated with, and/or secured to the telecommunication structure 10). As described in the present disclosure, the system 100 is configurable or configured to perform such inspecting by performing one or more of a variety functions, actions, and/or processes.

For example, the system 100 is configurable or configured to perform an inspection of a telecommunication structure 10, parts 10 or portions 10 of telecommunication structures 10, and/or any objects attached to, associated with, and/or secured to the telecommunication structure 10 via example embodiments of an unmanned aerial vehicle (e.g., unmanned aerial vehicle 200) and example embodiments of a control processor (e.g., control processor 300).

The unmanned aerial vehicle 200 may include one or more elements. For example, the unmanned aerial vehicle 200 may include an image capturing subsystem, an object identifying subsystem, a distance measuring subsystem, a navigation subsystem, an electromagnetic interference subsystem, and/or an onboard processor.

An example embodiment of the control processor 300 is configurable or configured to communicate information with the onboard processor of the unmanned aerial vehicle 200, process the information communicated with the onboard processor, generate one or more flight paths and/or geolocation-related information, and communicate such generated information to the onboard processor of the unmanned aerial vehicle 200.

Regarding the information communicated between the control processor 300 and the onboard processor, such information may include information communicated between the onboard processor and the image capturing subsystem, the object identifying subsystem, the distance measuring subsystem, the navigation subsystem, the electromagnetic interference subsystem, and/or the onboard processor itself. Such information may include, but is not limited to, location, geolocation, and/or orientation of the telecommunication structure 10 (and/or parts 10 or portions 10 of the structure 10, objects attached to, associated with, and/or secured to the structure 10 or objects 10); images of the telecommunication structure 10 and/or parts 10 or portions 10 of the structure 10; information (e.g., dimensions, central axis, quantity of sections, levels, information from one or more previous inspections, points of interest, physical damages, defects, faults, etc.) pertaining to the telecommunication structure 10; location of objects that are attached to, associated with, and/or secured to the telecommunication structure 10; images of objects that are attached to, associated with, and/or secured to the telecommunication structure 10; information (e.g., geometries, dimensions, shapes, dimensions, points of interest, physical damages, defects, faults, etc.) of one or more objects identified in the images; distance measurements, including distances between the unmanned aerial vehicle 200 and the telecommunication structure 10, parts 10 or portions 10 of the structure 10, and/or one or more objects attached to, associated with, and/or secured on the telecommunication structure 10; flight paths (e.g. first flight path, second flight path, third flight path, adjusted flight paths, etc.); navigation readings pertaining to movements of the unmanned aerial vehicle 200; information pertaining to electromagnetic interference signals (e.g., readings or measurements of the electromagnetic interference signals, threshold signal level, magnitude of the electromagnetic interference signals, location of source of the electromagnetic interference signals, direction of the electromagnetic interference signal); information pertaining to physical damages, defects, and/or faults of the telecommunication structure 10; geometries of the telecommunication structure 10 and/or one or more portions 10 or parts 10 of the telecommunication structure 10; geometries of each of the one or more objects identified; proposed maintenance and/or fixing of physical damages, defects, and/or faults identified on or for the telecommunication structure; historic information for one or more of the aforementioned information; etc.

As described in the present disclosure, when the system 100 receives information, the system 100 is configurable or configured to process the information to inspect, monitor, manage, review, assess, analyze, process, identify, determine, quantify, qualify, store, share, report and/or control the inspection of the telecommunication structure 10, parts 10 or portions 10 of the structure 10, and/or objects that are attached to, associated with, and/or secured to the telecommunication structure 10. The system 100 performs such processing of information to inspect telecommunication structure 10 via one or more processors (e.g., control processor 300, onboard processor, other processors of the unmanned aerial vehicle 200, etc.). Each processor 300 is configurable or configured to connect to, communicate with, cooperate with, manage, and/or receive communications from one or more other elements of the system 100.

As used in the present disclosure, when applicable, a reference to a system (e.g., system 100) or processor (e.g., control processor 300, onboard processor 270 of the unmanned aerial vehicle 200, etc.) may also refer to, apply to, and/or include one or more computing devices, processors, servers, systems, cloud-based computing, or the like, and/or functionality of one or more processors, computing devices, servers, systems, cloud-based computing, or the like. The system 100 and/or processors 300, 270 (and/or its elements, as described in the present disclosure) may be any processor, server, system, device, computing device, controller, microprocessor, microcontroller, microchip, semiconductor device, or the like, configurable or configured to perform, among other things, a processing and/or managing of information, searching for information, identifying of information, data communications, and/or any one or more other actions described above and in the present disclosure. Alternatively, or in addition, the system 100 and/or processors 300, 270 (and/or its elements, as described in the present disclosure) may include and/or be a part of a virtual machine, processor, computer, node, instance, host, or machine, including those in a networked computing environment.

As used in the present disclosure, a communication channel, network, wireless link, cloud, or the like, may be or include a collection of devices and/or virtual machines connected by communication channels that facilitate communications between devices and allow for devices to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. A communication channel, network, wireless link, Wi-Fi, mobile phone wireless hotspot, mobile data network, radio frequency receiver, cloud, or the like, may include, but is not limited to, computing grid systems, peer to peer systems, mesh-type systems, distributed computing environments, cloud computing environment, telephony systems, voice over IP (VoIP) systems, voice communication channels, voice broadcast channels, text-based communication channels, video communication channels, etc. Such communication channels, networks, wireless links, clouds, or the like, may include hardware and software infrastructures configured to form a virtual organization comprised of multiple resources which may be in geographically disperse locations. Communication channel, network, wireless link, cloud, or the like, may also refer to a communication medium between processes on the same device. Also as referred to herein, a network element, node, or server may be a device deployed to execute a program operating as a socket listener and may include software instances.

Although the figures may illustrate the system 100 as inspecting one telecommunication structure 10 and having one unmanned aerial vehicle 200 and one control processor 300, it is to be understood that the system 100 may inspect more than one telecommunication structure 10 and/or include more than one unmanned aerial vehicle 200 and/or more than one control processor 300 without departing from the teachings of the present disclosure. The system 100 may also include and/or communicate with one or more networks (not shown), communication channels (not shown), blockchains/DLTs (not shown), or the like, which may be used to enable and/or assist with communications between elements of the system 100.

These elements of the system 100 will now be further described with reference to the accompanying figures.

The Unmanned Aerial Vehicle (e.g., Unmanned Aerial Vehicle 200).

As illustrated in FIG. 1, the system 100 includes one or more unmanned aerial vehicles (e.g., unmanned aerial vehicle 200). As used in the present disclosure, the unmanned aerial vehicle 200 may be an aerial vehicle that is guided or not guided by a pilot/operator and/or may be guided autonomously and/or remotely. The unmanned aerial vehicle 200 is configurable or configured to cooperate with the control processor 300 to inspect one or more telecommunication structures 10, one or more parts 10 or portions 10 of telecommunication structures 10, and/or objects that are attached to, associated with, and/or secured to telecommunication structures 10. The unmanned aerial vehicle 200 is configurable or configured to aerially maneuver (e.g., fly, hover, elevate, ascend, descend, rotate, pivot, change orientation, etc.) with respect to the telecommunication structure 10, part 10 or portion 10 of the telecommunication structure 10, and/or object attached to, associated with, and/or secured to the telecommunication structure 10, including aerially travel according to any predetermined and/or dynamically determined flight path when performing an inspection.

As will be further described in the present disclosure, the unmanned aerial vehicle 200 may be configurable or configured to aerially maneuver based on, among other things, information (including flight plans) communicated with one or more control processors 300. In this regard, the unmanned aerial vehicle 200 is also configurable or configured to connect to, manage, and/or communicate with the control processor 300. The unmanned aerial vehicle 200 does so by connecting to and/or establishing a communication channel (e.g., wireless link, Bluetooth, WiFi, Long-Term Evolution (LTE), a radio-frequency ID (RFID) protocol, near-field communication (NFC), cellular connectivity, and/or any other wireless communication protocols) with the control processor 300. This allows the unmanned aerial vehicle 200 and the control processor to share, exchange, and/or communicate information and/or resources between each other. Alternatively or additionally, the control processor 300 may be provided, in part or in whole, in or on the unmanned aerial vehicle 200 to facilitate autonomous navigation.

The unmanned aerial vehicle 200 may be configurable or configured to be controlled by a user/operator within the vicinity of the telecommunication structure 10 being inspected or at any other remote location using a user device (e.g., remote control, mobile device, laptop, virtual reality (VR) device, augmented reality (AR) device, wearable device (e.g., glasses, helmet, watch, etc.), or the like) or a software application that enables control of the unmanned aerial vehicle 200. The inspections of the telecommunication structure 10 may be performed by a user who can manually determine and/or control the flight plan of the unmanned aerial vehicle 200. Alternatively or in addition, the unmanned aerial vehicle 200 may be configurable or configured to aerially maneuver autonomously and/or semi-autonomously (e.g., via commands from the control processor 300 and/or commands preloaded or provided in or on the unmanned aerial vehicle 200). In example embodiments, the unmanned aerial vehicle 200 may receive a fully or partially predetermined flight path from the control processor 300 and/or one or more elements of the system 100 before the inspection is initiated and/or during the inspection. For example, the predetermined flight path may be one or more historic flight paths that are determined or obtained based on previous inspections performed on the telecommunication structure 10. The predetermined flight path may be historic flight path that is retrieved from the control processor 300 prior to initiating the unmanned aerial vehicle 200 for an inspection. The predetermined flight path may also be a historic flight path that is selected in response to real-time or near real-time information received during the inspection. Further, the flight path of the unmanned aerial vehicle 200 may also be a new and/or dynamically generated flight path that is generated in response to the real-time or near real-time information obtained from processing the various information obtained during the inspection of the telecommunication structure 10, parts 10 or portions of the structure 10, and/or any objects attached to, associated with, and/or secured to the telecommunication structure 10.

When performing inspections on the telecommunication structure 10, the parts 10 or portions 10 of the structure 10, and/or the objects that are attached to, associated with, and/or secured to the telecommunication structure 10, the unmanned aerial vehicle 200 may be configurable or configured to receive information pertaining to the telecommunication structure 10, parts 10 or portions 10 of the structure 10, and/or objects. The information may include, but is not limited to, location or geolocation of the telecommunication structure 10, images of the telecommunication structure 10, information (e.g., geometries, dimensions, central axis, quantity of sections, levels, information from one or more previous inspections, points of interest, physical damages, defects, faults, etc.) on the telecommunication structure 10, etc. The unmanned aerial vehicle 200 may be configurable or configured to receive information on the location of the objects that are attached to, associated with, and/or secured to the telecommunication structure 10, images of the objects that are attached to, associated with, and/or secured to the telecommunication structure 10, information (e.g., geometries, dimensions, shapes, dimensions, points of interest, physical damages, defects, faults, etc.) of one or more objects identified in the images, etc. Further, the unmanned aerial vehicle 200 is also configurable or configured to receive distance information, including distance measurements between the unmanned aerial vehicle 200 and the one or more objects attached or secured on the telecommunication structure 10. Further, the unmanned aerial vehicle 200 is also configurable or configured to receive one or more flight paths (e.g. first flight path, second flight path, third flight path, adjusted flight paths, etc.). The unmanned aerial vehicle 200 may also be configurable or configured to receive information on navigation readings for the movements of the unmanned aerial vehicle 200. The unmanned aerial vehicle 200 may also be configurable or configured to receive information on electromagnetic signal readings, which may include readings or measurements of the electromagnetic interference signals, threshold signal level, magnitude of the electromagnetic interference signals, location of source of the electromagnetic interference signals, and/or direction of the electromagnetic interference signal. Also, the unmanned aerial vehicle 200 may be configurable or configured to receive reports generated by the control processor 300 pertaining to physical damages, defects, and/or faults of the telecommunication structure that were identified, geometries of each portion of the telecommunication structure, geometries of each of the one or more objects identified, and/or proposed maintenance and/or fixing of physical damages, defects, and/or faults identified for the telecommunication structure.

Figure 2:
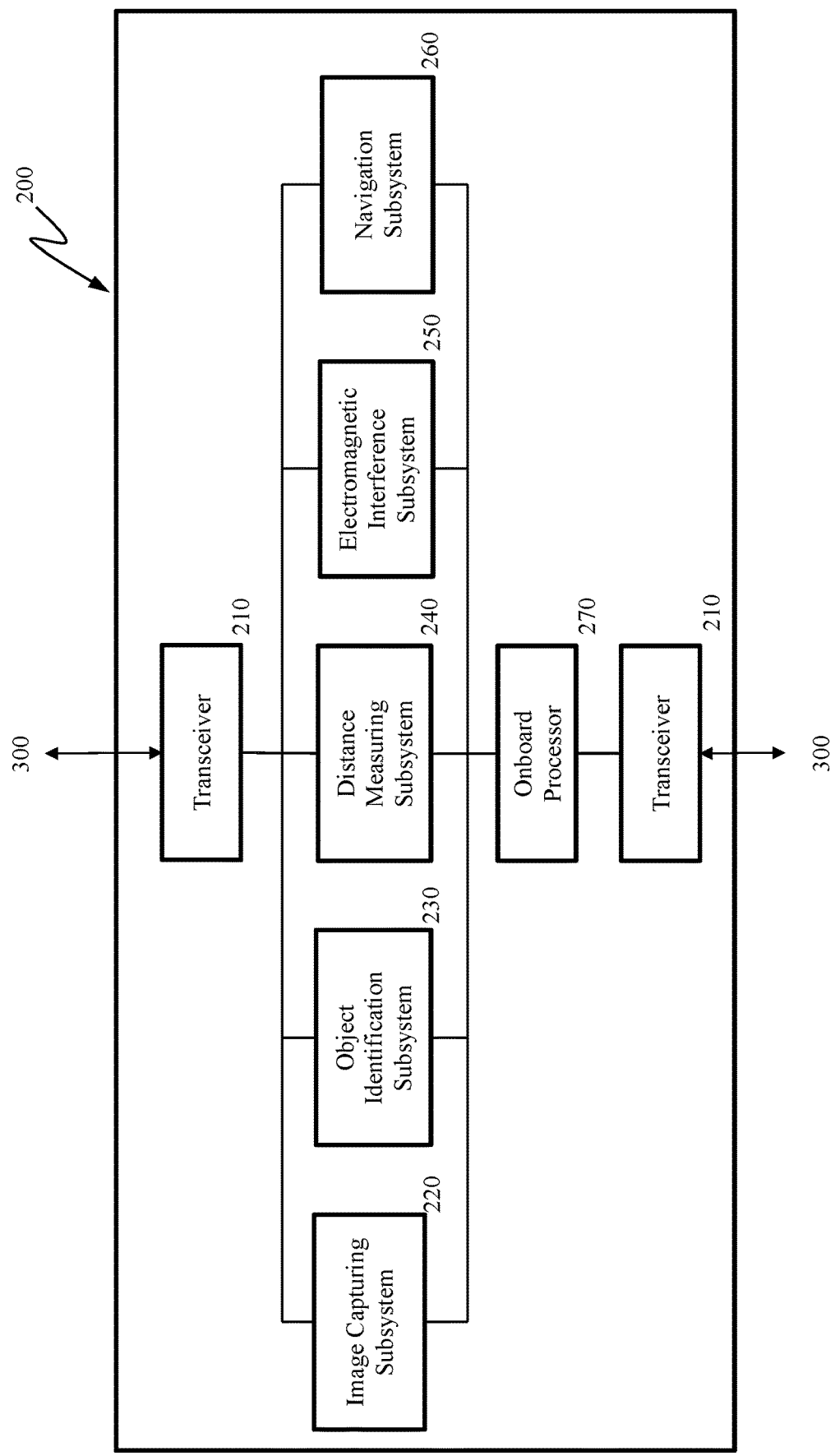
FIG. 2 is an illustration of an example embodiment of an unmanned aerial vehicle for performing inspections on a telecommunication structure.

As illustrated in FIG. 2, to perform one or more of the functions and/or actions as described above and in the present disclosure, the unmanned aerial vehicle 200 includes one or more elements. For example, the unmanned aerial vehicle 200 may include one or more transceivers 210. The unmanned aerial vehicle may also include one or more image capturing subsystems 220. The unmanned aerial vehicle 200 may also include one or more object identifying subsystems 230. The unmanned aerial vehicle 200 may also include one or more distance measuring subsystems 240. The unmanned aerial vehicle 200 may also include one or more electromagnetic interference subsystems 250. The unmanned aerial vehicle 200 may also include one or more navigation subsystems 260. The unmanned aerial vehicle 200 may also include one or more onboard processors 270. Although the figures may illustrate the unmanned aerial vehicle 200 having one transceiver 210, one image capturing subsystem 220, one object identifying subsystem 230, one distance measuring subsystem 240, one electromagnetic interference subsystem 250, one navigation subsystem 260, and one onboard processor 270, it is to be understood that the unmanned aerial vehicle 200 may be provided with more or less than one transceiver 210, more or less than one image capturing subsystem 220, more or less than one object identifying subsystem 230, more or less than one distance measuring subsystem 240, more or less than one electromagnetic interference subsystem 250, more or less than one navigation subsystem 260, and/or more or less than one onboard processor 270. Additionally or alternatively, the onboard processor 270 may be, include, and/or communicate with example embodiments of the control processor 300.

It is also to be understood in the present disclosure that, although the functions and/or processes performed by the unmanned aerial vehicle 200 are described in the present disclosure as being performed by particular elements of the unmanned aerial vehicle 200, the functions and/or processes performed by a particular element of the unmanned aerial vehicle 200 may also be performed by one or more other elements and/or cooperatively performed by more than one element of the unmanned aerial vehicle 200 without departing from the teachings of the present disclosure. It is also to be understood in the present disclosure that, although the functions and/or processes performed by the unmanned aerial vehicle 200 are described in the present disclosure as being performed by particular elements of the unmanned aerial vehicle 200, the functions and/or processes performed by two or more particular elements of the unmanned aerial vehicle 200 may be combined and performed by one element of the unmanned aerial vehicle 200 without departing from the teachings of the present disclosure.

These and other elements of the unmanned aerial vehicle system 200 will now be further described with reference to the accompanying figures.

The Transceiver (e.g., Transceiver 210)

As illustrated in FIG. 2, the unmanned aerial vehicle 200 includes transceiver (e.g., transceiver 210). The transceiver 210 is configurable or configured to communicate with one or more elements of the unmanned aerial vehicle 200. The transceiver 210 is also configurable or configured to communicate with one or more elements of the system 100, including the control processor 300, one or more databases (not shown), one or more communication channels (not shown), one or more information sources (not shown) (e.g., environmental information source; historic information source; real-time information source; etc.). In an example embodiment, the transceiver 210 is configurable or configured to enable one or more elements of the unmanned aerial vehicle 200 (e.g., the onboard processor 200, etc.) to communicate with the control processor 300.

The information received by the transceiver 210, as described above and in the present disclosure, may be received in real-time and/or near real-time. Alternatively or in addition, such information may be received in a periodic, intermittent, or sporadic manner (e.g., every 5 seconds, 10 seconds, 15 seconds, 30 seconds, 1 minute; no fixed period or pattern; etc.). Alternatively or in addition, such information may be received upon the occurrence (and/or non-occurrence) of an event, sequence of events, action, sequence of actions, condition, sequence of conditions, receipt of certain information, receipt of a sequence of certain information, process, sequence of processes, etc. (e.g., movement and/or change of position, location, geolocation, orientation, flight path, etc.). Alternatively or in addition, such information may be or include historic information. Alternatively or in addition, such information may be or include benchmark, average, model (or ideal), standard, and/or threshold (predetermined and/or dynamically determined) information.

The Image Capturing Subsystem (e.g., Image Capturing Subsystem 220)

As illustrated in FIG. 2, the unmanned aerial vehicle 200 includes an image capturing subsystem (e.g., image capturing subsystem 220). The image capturing subsystem 220 is configurable or configured to capture images, including images of the telecommunication structure 10, one or more parts 10 or portions 10 of the telecommunication structure 10, and/or one or more objects 10 attached to, associated with, and/or secured to the telecommunication structure 10. The image capturing subsystem 220 includes one or more image capturing devices 220 to perform the capturing of images, video images, audio, still images, etc. (referred to herein as "images"). The image capturing device 220 may include a camera, a digital camera, a video recorder, a light scanner, a stereo camera, an image sensor, and/or or any other devices capable of capturing images. The image capturing subsystem 220 is also configurable or configured to communicate with other elements of the unmanned aerial vehicle 200, including the onboard processor 270 of the unmanned aerial vehicle 200, one or more databases (not shown), and/or the control processor 300.

The images captured may include, but are not limited to, images of the telecommunication structure 10, one or more parts 10 or portions 10 of the telecommunication structure 10, and/or one or more objects 10 (e.g., antenna, antenna ancillaries, power supply module, power amplifier, repeater, transceivers, transmitters, digital signal processor, receivers, lightning arrestor, anemometer, solar irradiant meter, accelerometer, aviation obstruction lights, GPS tracker, birds nests, beehives, animal shelters, etc.) that are attached to, associated with, and/or secured to the telecommunication structure 10. Such images may provide and/or assist in providing (or estimating, extrapolating, predicting, assessing, etc.) one or more dimensions of the telecommunication structure 10 (e.g., height, width, etc.) (or part 10 or portion 10 of the telecommunication structure 10; or object 10 attached to, associated with, and/or secured to the telecommunication structure 10), one or more central axis/axes of the telecommunication structure 10 (or part 10 or portion 10 of the telecommunication structure 10; or object 10 attached to, associated with, and/or secured to the telecommunication structure 10), one or more sections and/or levels of the telecommunication structure 10 (or part 10 or portion 10 of the telecommunication structure 10; or object 10 attached to, associated with, and/or secured to the telecommunication structure 10), one or more orientations of the telecommunication structure 10 (or part 10 or portion 10 of the telecommunication structure 10; or object 10 attached to, associated with, and/or secured to the telecommunication structure 10), one or more of points of interests of the telecommunication structure 10 (e.g., locations of frequent defects or damages, locations of recent fixes or repairs, locations of undeterminable results, etc.) (or part 10 or portion 10 of the telecommunication structure 10; or object 10 attached to, associated with, and/or secured to the telecommunication structure 10), and/or any other information pertaining to the telecommunication structure 10 (or part 10 or portion 10 of the telecommunication structure 10; or object 10 attached to, associated with, and/or secured to the telecommunication structure 10).

In an example embodiment, the image capturing subsystem 220 is configurable or configured to capture images of the telecommunication structure 10, part 10 or portion 10 of the telecommunication structure 10, and/or objects that are attached to, associated with, and/or secured to the telecommunication structure 10. The image capturing subsystem 220 is able to capture a first image at a first geolocation along a first flight path when the unmanned aerial vehicle 200 is at the first geolocation. The first image as captured by the image capturing subsystem 220 at the first geolocation may include the entire telecommunication structure 10, a first portion 10 of the telecommunication structure 10, and/or an object 10 attached to, associated with, and/or secured to the telecommunication structure 10.

The image capturing subsystem 220 is also configurable or configured to capture a second image at a second geolocation when a flight path is generated (or adjusted, amended, edited, etc.) in response to a determination that a first signal level of a first electromagnetic interference signal received by the unmanned aerial vehicle 200 at the first geolocation is greater than or equal to a threshold signal level. The second image as captured by the image capturing subsystem 220 at the second geolocation may include the entire telecommunication structure 10, a first or second portion 10 of the telecommunication structure 10, and/or an object 10 attached to, associated with, and/or secured to the telecommunication structure 10.

The image capturing subsystem 220 is also configurable or configured to capture a third image at a third geolocation when a flight path is generated (or adjusted, amended, edited, etc.) in response to a determination that a second signal level of the first electromagnetic interference signal at the second geolocation is greater than or equal to the threshold signal level. The third image as captured by the image capturing subsystem 220 at the third geolocation may include the entire telecommunication structure 10, a first, second, or third portion 10 of the telecommunication structure 10, and/or an object 10 attached to, associated with, and/or secured to the telecommunication structure 10.

The image capturing subsystem 220 is also configurable or configured to capture a fourth image at a fourth geolocation when a flight path is generated (or adjusted, amended, edited, etc.) in response to a determination that a first signal level of a second electromagnetic interference signal at the first geolocation is greater than or equal to a threshold signal level. The fourth image as captured by the image capturing subsystem 210 at the fourth geolocation may include the entire telecommunication structure 10, a first, second, or third portion 10 of the telecommunication structure 10, and/or an object 10 attached to, associated with, and/or secured to the telecommunication structure 10.

The Object Identifying Subsystem (e.g., Object Identifying Subsystem 230)

As illustrated in FIG. 2, the unmanned aerial vehicle 200 includes an object identifying subsystem 230. The object identifying subsystem 230 is configurable or configured to identify and/or cooperate with the onboard processor 270 and/or control processor 300 to identify one or more parts 10 or portions 10 of the telecommunication structure 10 and/or one or more objects attached to, associated with, and/or secured to the telecommunication structure 10. The object identifying subsystem 230 may perform (and/or cooperate with the onboard processor 270 and/or control processor 300 to perform) such identifying by analyzing, among other things, geometries, dimensions, relative sizes, configurations, relationships, color, texture, context, shading, lighting, contrast, pixel, resolution, etc. in the images captured by the image capturing device 220; analyzing historic captured images; analyzing other information received by the transceiver 210; etc. The object identifying subsystem 230 is configurable or configured to detect and identify (and/or cooperate with the onboard processor 270 and/or control processor 300 to detect and identify) any two-dimensional and/or three-dimensional shapes/objects in the images captured by the image capturing device 220.

In an embodiment, the object identifying subsystem 230 may be configurable or configured to identify one or more parts 10 or portions 10 of the telecommunication structure 10 and/or one or more objects attached to, associated with, and/or secured to the telecommunication structure 10 using and/or in cooperation with artificial intelligence (AI, machine learning, and/or deep learning algorithms (e.g., using any suitable algorithms including, but not limited to, Region Based Convolutional Neural Networks (R-CNN), fast Region Based Convolutional Neural Networks (fast R-CNN), You Only Look Once (YOLO), Recurrent Neural Network (RNN), Long/Short Term Memory Network (LSTM), Hopfield Networks, Boltzmann Machine Network, Deep Belief Network, Deep Auto-Encoders and any other algorithms which may be used to detect and subsequently identify objects in images).

In another embodiment, the object identifying subsystem 230 may be configurable or configured to identify one or more parts 10 or portions 10 of the telecommunication structure 10 and/or one or more objects attached to, associated with, and/or secured to the telecommunication structure 10 using object recognition or feature matching algorithms. For example, the method of identifying one or more parts 10 or portions 10 of the telecommunication structure 10 and/or one or more objects attached to, associated with, and/or secured to the telecommunication structure 10 may be performed by partitioning, segmenting, or dividing the image into several sections or sub-images (e.g., using segmentation technology). In one or each of the sub-images, the object identifying subsystem 230 may extract one or more image feature that is present in the sub-image. The extracted features may include, but are not limited to, geometries, dimensions, measurements, colors, sizes, textures, shapes, and any other information which may describe the one or more objects in the image. The object identifying subsystem 230 may search for predetermined or preset reference features in a server or a library that matches the extracted one or more features of the sub-image. The predetermined or preset reference features of the objects are stored in a server or a library. The predetermined or preset reference features of the objects include information associated with the objects such as geometries, dimensions, measurements, colors, sizes, textures, shapes, and any other information which may describe the objects. The extracted one or more features of the sub-image is compared and determined whether the extracted one or more feature corresponds or matches with any predetermined or preset reference features of the object. Based on the corresponding or matching reference features, the one or more information associated with the reference feature is obtained by the object identifying subsystem 230 to identify the object in the sub-image or image.

The Distance Measuring Subsystem (e.g., Distance Measuring Subsystem 240)

As illustrated in FIG. 2, the unmanned aerial vehicle 200 includes a distance measuring subsystem (e.g., distance measuring subsystem 240). The distance measuring subsystem 240 is configurable or configured to determine and/or measure distances, including distances between the unmanned aerial vehicle 200 and telecommunication structure 10, one or more parts 10 or portions 10 of the telecommunication structure 10, and/or an object 10 attached to, associated with, and/or secured to the telecommunication structure 10. The distance measuring subsystem 240 may include a light detection and ranging (LiDAR) device, laser scanner, distance sensors, sonar distance measurement, laser distance measurement, microwave radar distance measurement, and any other devices capable of measuring distances between objects.

In an example embodiment, the distance measuring subsystem 240 is configurable or configured to measure a first distance between the unmanned aerial vehicle 200 (at a first geolocation along the first flight path) and the telecommunication structure 10, part 10 or portion 10 of the telecommunication structure 10, and/or objects that are attached to, associated with, and/or secured to the telecommunication structure 10.

The distance measuring subsystem 240 is also configurable or configured to measure a second distance between the unmanned aerial vehicle 200 (at a second geolocation) and the telecommunication structure 10, part 10 or portion 10 of the telecommunication structure 10, and/or objects that are attached to, associated with, and/or secured to the telecommunication structure 10 when a flight path is generated (or adjusted, amended, edited, etc.) in response to a determination that a first signal level of a first electromagnetic interference signal received by the unmanned aerial vehicle 200 at the first geolocation is greater than or equal to a threshold signal level.

The distance measuring subsystem 240 is also configurable or configured to measure a third distance between the unmanned aerial vehicle 200 (at a third geolocation) and the telecommunication structure 10, part 10 or portion 10 of the telecommunication structure 10, and/or objects that are attached to, associated with, and/or secured to the telecommunication structure 10 when a flight path is generated (or adjusted, amended, edited, etc.) in response to a determination that a second signal level of the first electromagnetic interference signal at the second geolocation is greater than or equal to the threshold signal level.

The distance measuring subsystem 240 is also configurable or configured to measure a fourth distance between the unmanned aerial vehicle 200 (at a fourth geolocation) and the telecommunication structure 10, part 10 or portion 10 of the telecommunication structure 10, and/or objects that are attached to, associated with, and/or secured to the telecommunication structure 10 when a flight path is generated (or adjusted, amended, edited, etc.) in response to a determination that a first signal level of a second electromagnetic interference signal at the first geolocation is greater than or equal to a threshold signal level.

The Electromagnetic Interference Subsystem (e.g., Electromagnetic Interference Subsystem 250)

As illustrated in FIG. 2, the unmanned aerial vehicle 200 includes an electromagnetic interference subsystem (e.g., electromagnetic interference subsystem 250) configurable or configured to detect one or more electromagnetic interference signals (e.g., interference signals from the telecommunication structure 10). The electromagnetic interference subsystem 250 is also configurable or configured to measure signal levels of the one or more electromagnetic interference signals. The electromagnetic interference subsystem 250 may include an electromagnetic signal sensor, an electromagnetic field meter, radio frequency, receiver, antenna, and any other devices which may be used to determine one or more signal levels for the electromagnetic interference signals.

In example embodiments, the electromagnetic interference subsystem 250 may be configurable or configured to identify a location of a source of the electromagnetic interference signals. The electromagnetic interference subsystem 250 may also be configurable or configured to identify a direction of the electromagnetic interference signals. For example, the electromagnetic interference subsystem 250 may receive a plurality of electromagnetic interference signals when the unmanned aerial vehicle 200 is positioned at a first geolocation. The electromagnetic interference subsystem 250 may be configurable or configured to determine whether or not one, some or all of the electromagnetic interference signals are from the same source, area, and/or location of the telecommunication structure 10.

The electromagnetic interference subsystem 250 is also configurable or configured to obtain and/or generate one or more threshold signal levels for the electromagnetic interference signals. The one or more threshold signal levels may be predetermined (e.g. 700 MHz, 900 MHz, 1.8 GHz, 2.1 GHz, 2.4 GHz, 2.6 GHz, 5.8 GHz, 7 GHz, 13 GHz, 15 GHz, 18 GHz, 23 GHz, signal strength threshold less than 50 dBm) and/or dynamically determined (e.g., based on one or more of the following: the first electromagnetic interference signal, a magnitude of the first signal level, a location of a source of the first electromagnetic interference signal, and/or a direction of a source of the first electromagnetic interference signal).

In an example embodiment, the electromagnetic interference subsystem 250 is configurable or configured to detect and measure one or more electromagnetic interference signals when the unmanned aerial vehicle 200 is at one or more geolocations. For example, the electromagnetic interference subsystem 250 may detect one or more electromagnetic interference signals when the unmanned aerial vehicle 200 is at a first geolocation. Once the one or more electromagnetic interference signals are detected, the electromagnetic interference subsystem 250 is configurable or configured to measure signal levels of the one or more electromagnetic interference signals at the first geolocation. The electromagnetic interference subsystem 250 may also detect one or more electromagnetic interference signals when the unmanned aerial vehicle 200 is at a second geolocation. Once the one or more electromagnetic interference signals are detected, the electromagnetic interference subsystem 250 is configurable or configured to measure signal levels of the one or more electromagnetic interference signals at the second geolocation. The electromagnetic interference subsystem 250 may also detect one or more electromagnetic interference signals when the unmanned aerial vehicle 200 is at a third geolocation. Once the one or more electromagnetic interference signals are detected, the electromagnetic interference subsystem 250 is configurable or configured to measure signal levels of the one or more electromagnetic interference signals at the third geolocation. The electromagnetic interference subsystem 250 may also detect one or more electromagnetic interference signals when the unmanned aerial vehicle 200 is at a fourth geolocation. Once the one or more electromagnetic interference signal is detected, the electromagnetic interference subsystem 250 is configurable or configured to measure signal levels of the one or more electromagnetic interference signals at the fourth geolocation. And so on.

The Navigation Subsystem (e.g., the Navigation Subsystem 260)

As illustrated in FIG. 2, the unmanned aerial vehicle 200 includes a navigation subsystem (e.g., navigation subsystem 260) configurable or configured to control movements of the unmanned aerial vehicle 200 so as to navigate, position, orientate, and/or direct the unmanned aerial vehicle 200 to a desired position, geolocation, destination, orientation, and/or direction. The navigation subsystem 260 may include a Global Positioning System (GPS) or any other Global Navigation Satellite System (GNSS) based navigation device. The navigation subsystem 260 is also configurable or configured to be in communication with the onboard processor 270 of the unmanned aerial vehicle 200. This enables the navigation subsystem 260 to communicate commands, instructions, geolocation, orientation information, direction information, and/or any information related to the navigation of the unmanned aerial vehicle 200 with the onboard processor 270, other elements of the unmanned aerial vehicle, the control processor 300, and/or one or more other elements of the system 100.

In an embodiment, the navigation subsystem 260 is configurable or configured to receive commands and/or information from the onboard processor 270 and/or control processor 300 (via the onboard processor 260) to determine a route (e.g., flight path) for the unmanned aerial vehicle 200, direction for the unmanned aerial vehicle 200, orientation for the unmanned aerial vehicle 200, speed/velocity of/for the unmanned aerial vehicle 200, etc. The commands and/or information communicated between the navigation subsystem 260 and the onboard processor 270 and/or control processor 300 may include information pertaining to one or more flight paths, geospatial information, directions, orientation information, points of interest of the telecommunication structure 10, geolocation of destination/location of interest, and any other information related to navigating and controlling the unmanned aerial vehicle 200.

The navigation subsystem 260 may also receive commands and/or information (e.g., flight paths) dynamically generated by the control processor 300 and/or onboard processor 270 based on the real-time and/or near real-time information gathered by one or more elements of the unmanned aerial vehicle 200 and/or system 100, including the transceiver 210, image capturing subsystem 220, object identifying subsystem 230, distance measuring subsystem 240, electromagnetic interference subsystem 250, and/or onboard processor 270. The flight path as generated based on the information received may be a general flight path and/or an initial flight path (e.g., first flight path) for a particular session of inspection. The information received for generating the general flight path and/or first flight path includes, but is not limited to, a geolocation of the telecommunication structure 10; one or more dimensions of the telecommunication structure 10; a central axis of the telecommunication structure 10; a quantity of sections and/or levels of the telecommunication structure 10; historic information from one or more previous inspections of the telecommunication structure 10; and/or one or more points of interest of the telecommunication structure 10. The one or more points of interest of the telecommunication structure 10 may be determined from previous inspections performed on the telecommunication structure 10. This may include one or more historic locations on the telecommunication structure 10 where defects were previously identified; one or more common locations on the telecommunication structure 10 where defects are commonly identified; one or more historic locations on the telecommunication structure 10 where fixes were previously performed; one or more common locations on the telecommunication structure 10 where fixes are commonly performed; one or more historic environmental information for the geolocation of the telecommunication structure; one or more locations for undeterminable results and/or one or more current environmental information for the geolocation of the telecommunication structure.

The navigation subsystem 260 may also receive adjustments to initial, predetermined, and/or dynamically generated flight paths (e.g., first flight path) or subsequent flight paths (e.g., second flight path, third flight path, fourth flight path, etc.). The adjustments to flight paths may be generated by the control processor 300 and/or onboard processor 270 in response to real-time or near real-time information, including information pertaining to the signal level of the electromagnetic interference signals processed by the electromagnetic interference subsystem 240. Additionally or alternatively, the commands and/or information may also be a new flight path generated by the control processor 300 in response to real-time or near real-time information on the signal level of the electromagnetic interference signal by the electromagnetic interference subsystem 240.

The Onboard Processor (e.g., the Onboard Processor 270)

As illustrated in FIG. 2, the unmanned aerial vehicle 200 includes an onboard processor (e.g., onboard processor 270). The onboard processor 270 is configurable or configured to be in communication with one or more elements of the unmanned aerial vehicle 200, the control processor 300, and/or one or more other elements of the system 100 (e.g., databases (not shown), communication channels (not shown), information sources (not shown), etc.). For example, the onboard processor 270 may be in communication with the transceiver 210, the image capturing subsystem 220, the object identifying subsystem 230, the distance measuring subsystem 240, the electromagnetic interference subsystem 250, and/or the navigation subsystem 260.

In an example embodiment, the onboard processor 270 is configurable or configured to perform or assist or cooperate in performing processing for one or more elements of the unmanned aerial vehicle 200, the control processor 300, and/or one or more other elements of the system 100.

For example, the onboard processor 270 is configurable or configured to process information communicated by the transceiver 210. The onboard processor 270 is also configurable or configured to process images captured by the image capturing subsystem 220 and/or cooperate and/or assist the image capturing subsystem 220 and/or control processor 300 to process images captured by the image capturing subsystem 220. Such processing of the images may include providing, estimating, extrapolating, predicting, assessing, etc., based on one or more images, one or more dimensions of the telecommunication structure 10 (e.g., height, width, etc.) (or part 10 or portion 10 of the telecommunication structure 10; or object 10 attached to, associated with, and/or secured to the telecommunication structure 10), one or more central axis/axes of the telecommunication structure 10 (or part 10 or portion 10 of the telecommunication structure 10; or object 10 attached to, associated with, and/or secured to the telecommunication structure 10), one or more sections and/or levels of the telecommunication structure 10 (or part 10 or portion 10 of the telecommunication structure 10; or object 10 attached to, associated with, and/or secured to the telecommunication structure 10), one or more orientations of the telecommunication structure 10 (or part 10 or portion 10 of the telecommunication structure 10; or object 10 attached to, associated with, and/or secured to the telecommunication structure 10), one or more of points of interests of the telecommunication structure 10 (e.g., locations of frequent defects or damages, locations of recent fixes or repairs, locations of undeterminable results, etc.) (or part 10 or portion 10 of the telecommunication structure 10; or object 10 attached to, associated with, and/or secured to the telecommunication structure 10), and/or any other information pertaining to the telecommunication structure 10 (or part 10 or portion 10 of the telecommunication structure 10; or object 10 attached to, associated with, and/or secured to the telecommunication structure 10).

As another example, the onboard processor 270 is configurable or configured to process information and/or cooperate and/or assist the control processor 300 to process information to identify one or more parts 10 or portions 10 of the telecommunication structure 10 and/or one or more objects attached to, associated with, and/or secured to the telecommunication structure 10. Such identifying may be performed by analyzing, among other things, geometries, dimensions, relative sizes, configurations, relationships, color, texture, context, shading, lighting, contrast, etc. in the images captured by the image capturing device 220; analyzing historic captured images; analyzing other information received by the transceiver 210; etc.

As another example, the onboard processor 270 is configurable or configured to process information from the distance measuring subsystem 240 and/or cooperate and/or assist the distance measuring subsystem 240 and/or control processor 300 to process information from the distance measuring subsystem 240 so as to determine and/or measure distances, including distances between the unmanned aerial vehicle 200 and telecommunication structure 10, one or more parts 10 or portions 10 of the telecommunication structure 10, and/or an object 10 attached to, associated with, and/or secured to the telecommunication structure 10.

As another example, the onboard processor 270 is configurable or configured to process information from the electromagnetic interference subsystem 250 and/or cooperate and/or assist the electromagnetic interference subsystem 250 and/or control processor 300 to process information from the electromagnetic interference subsystem 250 so as to identify a location of a source of one or more electromagnetic interference signals; identify a direction of one or more electromagnetic interference signals; determine whether or not one, some or all of the electromagnetic interference signals are from the same source, area, and/or location of the telecommunication structure 10; etc.

In yet another example, the onboard processor 270 is configurable or configured to process information from the navigation subsystem 260 and/or cooperate and/or assist the navigation subsystem 260 and/or control processor 300 to process information from the navigation subsystem 260 so as to control movements of the unmanned aerial vehicle 200, including navigating, positioning, orientating, and/or directing the unmanned aerial vehicle 200 to a desired position, geolocation, destination, orientation, and/or direction.

The Control Processor (e.g., the Control Processor 300)

As illustrated in FIG. 1, the system 100 includes one or more control processors (e.g., control processor 300). The control processor 300 is configurable or configured to be in communication with one or more elements of the system 100, including one or more elements of the unmanned aerial vehicle 200, databases (not shown), communication channels (not shown), information sources (not shown), etc. For example, the control processor 300 may be in communication with the transceiver 210, the image capturing subsystem 220, the object identifying subsystem 230, the distance measuring subsystem 240, the electromagnetic interference subsystem 250, the navigation subsystem 260, and/or the onboard processor 270.

As will be further described in the present disclosure, the control processor 300 may be configurable or configured to control and/or assist in controlling aerial maneuvers and/or other functions of the unmanned aerial vehicle 200. The control processor 300 may communicate with the unmanned aerial vehicle 200 via a communication channel (e.g., wireless link, Bluetooth, WiFi, Long-Term Evolution (LTE), a radio-frequency ID (RFID) protocol, near-field communication (NFC), cellular connectivity, and/or any other wireless communication protocols). Alternatively or additionally, the control processor 300 may be provided, in part or in whole, in or on the unmanned aerial vehicle 200 to facilitate autonomous navigation.

When performing inspections on the telecommunication structure 10, the parts 10 or portions 10 of the structure 10, and/or the objects that are attached to, associated with, and/or secured to the telecommunication structure 10, the control processor 300 may be configurable or configured to receive information pertaining to the telecommunication structure 10, parts 10 or portions 10 of the structure 10, and/or objects. The information may include, but is not limited to, location or geolocation of the telecommunication structure 10, images of the telecommunication structure 10, information (e.g., geometries, dimensions, central axis, quantity of sections, levels, information from one or more previous inspections, points of interest, physical damages, defects, faults, etc.) on the telecommunication structure 10, etc. The control processor 300 may be configurable or configured to receive information on the location of the objects that are attached to, associated with, and/or secured to the telecommunication structure 10, images of the objects that are attached to, associated with, and/or secured to the telecommunication structure 10, information (e.g., geometries, dimensions, shapes, dimensions, points of interest, physical damages, defects, faults, etc.) of one or more objects identified in the images, etc. Further, the control processor 300 is also configurable or configured to receive distance information, including distance measurements between the unmanned aerial vehicle 200 and the one or more objects attached or secured on the telecommunication structure 10. Further, the control processor 300 is also configurable or configured to receive one or more flight paths (e.g. first flight path, second flight path, third flight path, adjusted flight paths, etc.). The control processor 300 may also be configurable or configured to receive information on navigation readings for the movements of the unmanned aerial vehicle 200. The control processor 300 may also be configurable or configured to receive information on electromagnetic signal readings, which may include readings or measurements of the electromagnetic interference signals, threshold signal level, magnitude of the electromagnetic interference signals, location of source of the electromagnetic interference signals, and/or direction of the electromagnetic interference signal. Also, the control processor 300 may be configurable or configured to generate and/or receive previously generated reports pertaining to physical damages, defects, and/or faults of the telecommunication structure that were identified, geometries of each portion of the telecommunication structure, geometries of each of the one or more objects identified, and/or proposed maintenance and/or fixing of physical damages, defects, and/or faults identified for the telecommunication structure.

Figure 3:
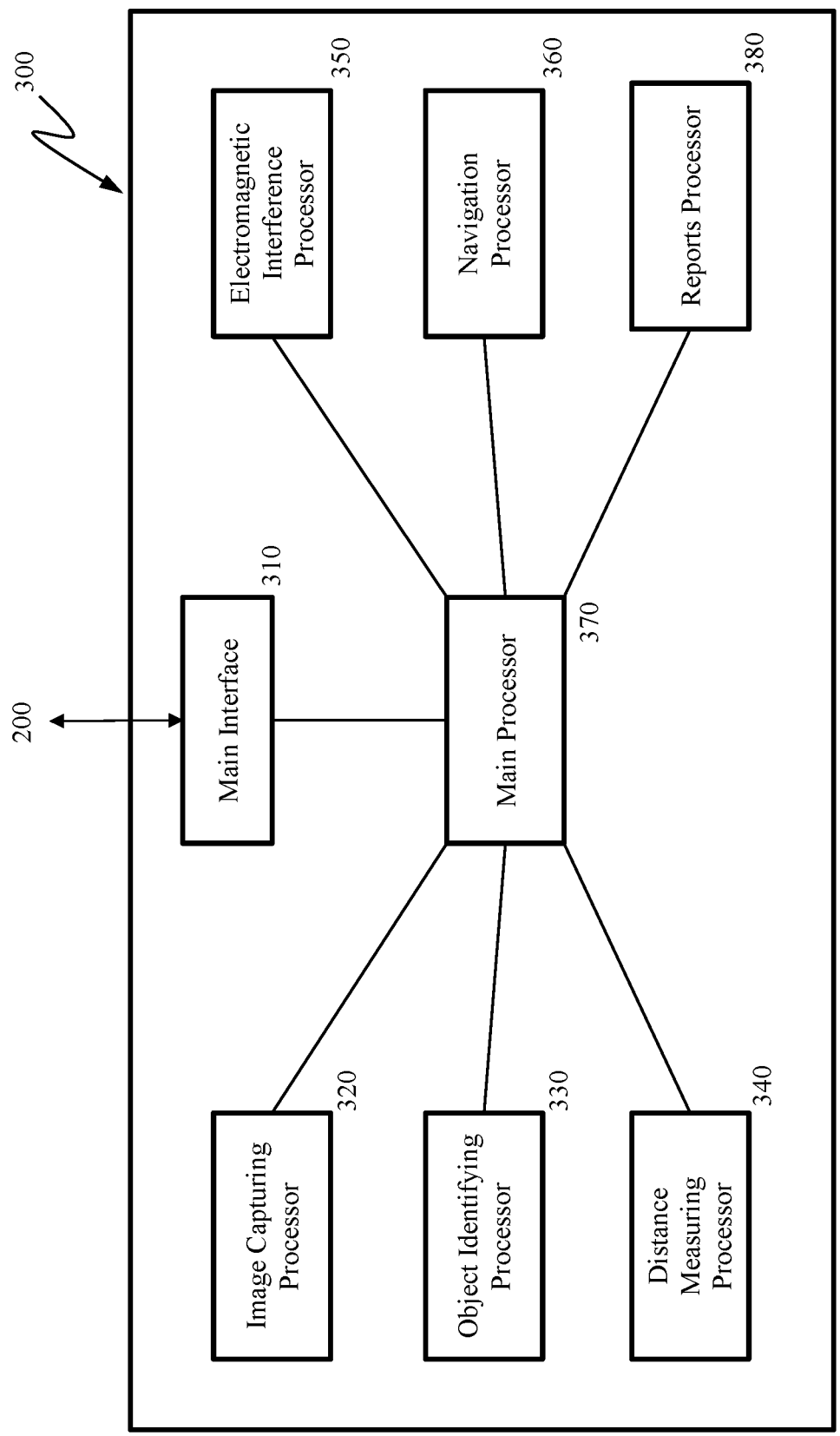
FIG. 3 is an illustration of an example embodiment of a control processor for performing inspections on a telecommunication structure.

As illustrated in FIG. 3, to perform one or more of the functions and/or actions as described above and in the present disclosure, the control processor 300 includes one or more elements. For example, the control processor 300 may include one or more main interfaces 310. The control processor 300 may also include one or more image capturing processors 320. The control processor 300 may also include one or more object identifying processors 330. The control processor 300 may also include one or more distance measuring processors 340. The control processor 300 may also include one or more electromagnetic interference processors 350. The control processor 300 may also include one or more navigation processors 360. The control processor 300 may also include one or more main processors 370. The control processor 300 may also include one or more reports processors 380. Although the figures may illustrate the control processor 300 having one main interface 310, one image capturing processor 320, one object identifying processor 330, one distance measuring processor 340, one electromagnetic interference processor 350, one navigation processor 360, one main processor 370, and one reports processor 380, it is to be understood that the control processor 300 may include more or less than one main interface 310, more or less than one image capturing processor 320, more or less than one object identifying processor 330, more or less than one distance measuring processor 340, more or less than one electromagnetic interference processor 350, more or less than one navigation processor 360, more or less than one main processor 370, and more or less than one reports processor 380. Additionally or alternatively, the control processor 300 may be, include, and/or communicate with example embodiments of the onboard processor 270.

It is also to be understood in the present disclosure that, although the functions and/or processes performed by the control processor 300 are described in the present disclosure as being performed by particular elements of the control processor 300, the functions and/or processes performed by a particular element of the control processor 300 may also be performed by one or more other elements and/or cooperatively performed by more than one element of the control processor 300 without departing from the teachings of the present disclosure. It is also to be understood in the present disclosure that, although the functions and/or processes performed by the control processor 300 are described in the present disclosure as being performed by particular elements of the control processor 300, the functions and/or processes performed by two or more particular elements of the control processor 300 may be combined and performed by one element of the control processor 300 without departing from the teachings of the present disclosure.

These and other elements of the control processor 300 will now be further described with reference to the accompanying figures.

The Main Interface (e.g., Main Interface 310)

As illustrated in FIG. 3, the control processor 300 includes a main interface (e.g., main interface 310). The main interface 310 is configurable or configured to communicate with one or more elements of the unmanned aerial vehicle 200. The main interface 310 is also configurable or configured to communicate with one or more elements of the system 100, including one or more databases (not shown), one or more communication channels (not shown), one or more information sources (not shown) (e.g., environmental information source; historic information source; real-time information source; etc.). In an example embodiment, the main interface 310 is configurable or configured to enable one or more elements of the unmanned aerial vehicle 200 (e.g., the onboard processor 200, etc.) to communicate with the control processor 300.

The information received by the main interface 310, as described above and in the present disclosure, may be received in real-time and/or near real-time. Alternatively or in addition, such information may be received in a periodic, intermittent, or sporadic manner (e.g., every 5 seconds, 10 seconds, 15 seconds, 30 seconds, 1 minute; no fixed period or pattern; etc.). Alternatively or in addition, such information may be received upon the occurrence (and/or non-occurrence) of an event, sequence of events, action, sequence of actions, condition, sequence of conditions, receipt of certain information, receipt of a sequence of certain information, process, sequence of processes, etc. (e.g., movement and/or change of position, location, geolocation, orientation, flight path, etc.). Alternatively or in addition, such information may be or include historic information. Alternatively or in addition, such information may be or include benchmark, average, model (or ideal), standard, and/or threshold (predetermined and/or dynamically determined) information.

The Image Capturing Processor (e.g., Image Capturing Processor 320)

As illustrated in FIG. 3, the control processor 300 includes an image capturing processor (e.g., image capturing processor 320). The image capturing processor 320 is configurable or configured to process images captured by the image capturing subsystem 220, including images of the telecommunication structure 10, one or more parts 10 or portions 10 of the telecommunication structure 10, and/or one or more objects 10 attached to, associated with, and/or secured to the telecommunication structure 10. The image capturing processor 320 is also configurable or configured to communicate with other elements of the control processor 300 and/or unmanned aerial vehicle 200, including the main processor 370, the onboard processor 270 of the unmanned aerial vehicle 200, one or more databases (not shown), and/or the control processor 300.

The captured images processed by the image capturing processor 320 may include, but are not limited to, images of the telecommunication structure 10, one or more parts 10 or portions 10 of the telecommunication structure 10, and/or one or more objects 10 (e.g., antenna ancillaries, power supply module, power amplifier, repeater, transceivers, transmitters, digital signal processor, receivers, lightning arrestor, anemometer, solar irradiant meter, accelerometer, aviation obstruction lights, GPS tracker, birds nests, beehives, animal shelters, etc.) that are attached to, associated with, and/or secured to the telecommunication structure 10. Such images may provide and/or assist in providing (or estimating, extrapolating, predicting, assessing, etc.) one or more dimensions of the telecommunication structure 10 (e.g., height, width, etc.) (or part 10 or portion 10 of the telecommunication structure 10; or object 10 attached to, associated with, and/or secured to the telecommunication structure 10), one or more central axis/axes of the telecommunication structure 10 (or part 10 or portion 10 of the telecommunication structure 10; or object 10 attached to, associated with, and/or secured to the telecommunication structure 10), one or more sections and/or levels of the telecommunication structure 10 (or part 10 or portion 10 of the telecommunication structure 10; or object 10 attached to, associated with, and/or secured to the telecommunication structure 10), one or more orientations of the telecommunication structure 10 (or part 10 or portion 10 of the telecommunication structure 10; or object 10 attached to, associated with, and/or secured to the telecommunication structure 10), one or more of points of interests of the telecommunication structure 10 (e.g., locations of frequent defects or damages, locations of recent fixes or repairs, locations of undeterminable results, etc.) (or part 10 or portion 10 of the telecommunication structure 10; or object 10 attached to, associated with, and/or secured to the telecommunication structure 10), and/or any other information pertaining to the telecommunication structure 10 (or part 10 or portion 10 of the telecommunication structure 10; or object 10 attached to, associated with, and/or secured to the telecommunication structure 10).

In an example embodiment, the image capturing processor 320 is configurable or configured to process images of the telecommunication structure 10, part 10 or portion 10 of the telecommunication structure 10, and/or objects that are attached to, associated with, and/or secured to the telecommunication structure 10. The image capturing processor 320 is able to process a first image captured at a first geolocation along a first flight path when the unmanned aerial vehicle 200 is at the first geolocation. The first image as captured by the image capturing subsystem 220 at the first geolocation may include the entire telecommunication structure 10, a first portion 10 of the telecommunication structure 10, and/or an object 10 attached to, associated with, and/or secured to the telecommunication structure 10.

The image capturing processor 320 is also configurable or configured to process a second image captured at a second geolocation when a flight path is generated (or adjusted, amended, edited, etc.) in response to a determination that a first signal level of a first electromagnetic interference signal received by the unmanned aerial vehicle 200 at the first geolocation is greater than or equal to a threshold signal level. The second image as captured by the image capturing subsystem 220 at the second geolocation may include the entire telecommunication structure 10, a first or second portion 10 of the telecommunication structure 10, and/or an object 10 attached to, associated with, and/or secured to the telecommunication structure 10.

The image capturing processor 320 is also configurable or configured to process a third image captured at a third geolocation when a flight path is generated (or adjusted, amended, edited, etc.) in response to a determination that a second signal level of the first electromagnetic interference signal at the second geolocation is greater than or equal to the threshold signal level. The third image as captured by the image capturing subsystem 220 at the third geolocation may include the entire telecommunication structure 10, a first, second, or third portion 10 of the telecommunication structure 10, and/or an object 10 attached to, associated with, and/or secured to the telecommunication structure 10.

The image capturing processor 320 is also configurable or configured to process a fourth image captured at a fourth geolocation when a flight path is generated (or adjusted, amended, edited, etc.) in response to a determination that a first signal level of a second electromagnetic interference signal at the first geolocation is greater than or equal to a threshold signal level. The fourth image as captured by the image capturing subsystem 210 at the fourth geolocation may include the entire telecommunication structure 10, a first, second, or third portion 10 of the telecommunication structure 10, and/or an object 10 attached to, associated with, and/or secured to the telecommunication structure 10.

The Object Identifying Processor (e.g., Object Identifying Processor 330)

As illustrated in FIG. 3, the control processor includes an object identifying processor 330. The object identifying processor 330 is configurable or configured to identify and/or cooperate with the onboard processor 270 and/or object identifying subsystem 230 to identify one or more parts 10 or portions 10 of the telecommunication structure 10 and/or one or more objects attached to, associated with, and/or secured to the telecommunication structure 10. The object identifying processor 330 may perform (and/or cooperate with the onboard processor 270 and/or object identifying subsystem 230 to perform) such identifying by analyzing, among other things, geometries, dimensions, relative sizes, configurations, relationships, color, texture, context, shading, lighting, contrast, etc. in the images captured by the image capturing device 220; analyzing historic captured images; analyzing other information received by the transceiver 210; etc. The object identifying processor 330 is configurable or configured to detect and identify (and/or cooperate with the onboard processor 270 and/or object identifying subsystem 230 to detect and identify) any two-dimensional and/or three-dimensional shapes/objects in the images captured by the image capturing device 220.

In an embodiment, the object identifying processor 330 may be configurable or configured to identify one or more parts 10 or portions 10 of the telecommunication structure 10 and/or one or more objects attached to, associated with, and/or secured to the telecommunication structure 10 using and/or in cooperation with artificial intelligence (AI, machine learning, and/or deep learning algorithms (e.g., using any suitable algorithms including, but not limited to, Region Based Convolutional Neural Networks (R-CNN), fast Region Based Convolutional Neural Networks (fast R-CNN), You Only Look Once (YOLO), Recurrent Neural Network (RNN), Long/Short Term Memory Network (LSTM), Hopfield Networks, Boltzmann Machine Network, Deep Belief Network, Deep Auto-Encoders and any other algorithms which may be used to detect and subsequently identify objects in images).

In another embodiment, the object identifying processor 330 may be configurable or configured to identify one or more parts 10 or portions 10 of the telecommunication structure 10 and/or one or more objects attached to, associated with, and/or secured to the telecommunication structure 10 using object recognition or feature matching algorithms. For example, the method of identifying one or more parts 10 or portions 10 of the telecommunication structure 10 and/or one or more objects attached to, associated with, and/or secured to the telecommunication structure 10 may be performed by partitioning, segmenting, or dividing the image into several sections or sub-images (e.g., using segmentation technology). In one or each of the sub-images, the object identifying processor 330 may extract one or more image feature that is present in the sub-image. The extracted features may include, but are not limited to, geometries, dimensions, measurements, colors, sizes, textures, shapes, and any other information which may describe the one or more objects in the image. The object identifying processor 330 may search for predetermined or preset reference features in a server or a library that matches the extracted one or more features of the sub-image. The predetermined or preset reference features of the objects are stored in a server or a library. The predetermined or preset reference features of the objects include information associated with the objects such as geometries, dimensions, measurements, colors, sizes, textures, shapes, and any other information which may describe the objects. The extracted one or more features of the sub-image is compared and determined whether the extracted one or more feature corresponds or matches with any predetermined or preset reference features of the object. Based on the corresponding or matching reference features, the one or more information associated with the reference feature is obtained by the object identifying subsystem 230 to identify the object in the sub-image or image.

The Distance Measuring Processor (e.g., Distance Measuring Processor 340)

As illustrated in FIG. 3, the control processor 300 includes a distance measuring processors (e.g., distance measuring processors 340). The distance measuring processor 340 is configurable or configured to determine and/or measure (and/or cooperate with the onboard processor 270 and/or distance measuring subsystem 240 to determine and/or measure) distances, including distances between the unmanned aerial vehicle 200 and telecommunication structure 10, one or more parts 10 or portions 10 of the telecommunication structure 10, and/or an object 10 attached to, associated with, and/or secured to the telecommunication structure 10.

In an example embodiment, the distance measuring processor 340 is configurable or configured to process the measurement (or estimation, etc.) of a first distance between the unmanned aerial vehicle 200 (at a first geolocation along the first flight path) and the telecommunication structure 10, part 10 or portion 10 of the telecommunication structure 10, and/or objects that are attached to, associated with, and/or secured to the telecommunication structure 10.

The distance measuring processor 340 is also configurable or configured to process the measurement (or estimation, etc.) of a second distance between the unmanned aerial vehicle 200 (at a second geolocation) and the telecommunication structure 10, part 10 or portion 10 of the telecommunication structure 10, and/or objects that are attached to, associated with, and/or secured to the telecommunication structure 10 when a flight path is generated (or adjusted, amended, edited, etc.) in response to a determination that a first signal level of a first electromagnetic interference signal received by the unmanned aerial vehicle 200 at the first geolocation is greater than or equal to a threshold signal level.

The distance measuring processor 340 is also configurable or configured to process a measurement (or estimation, etc.) of a third distance between the unmanned aerial vehicle 200 (at a third geolocation) and the telecommunication structure 10, part 10 or portion 10 of the telecommunication structure 10, and/or objects that are attached to, associated with, and/or secured to the telecommunication structure 10 when a flight path is generated (or adjusted, amended, edited, etc.) in response to a determination that a second signal level of the first electromagnetic interference signal at the second geolocation is greater than or equal to the threshold signal level.

The distance measuring processor 340 is also configurable or configured to process a measurement (or estimation, etc.) of a fourth distance between the unmanned aerial vehicle 200 (at a fourth geolocation) and the telecommunication structure 10, part 10 or portion 10 of the telecommunication structure 10, and/or objects that are attached to, associated with, and/or secured to the telecommunication structure 10 when a flight path is generated (or adjusted, amended, edited, etc.) in response to a determination that a first signal level of a second electromagnetic interference signal at the first geolocation is greater than or equal to a threshold signal level.

The Electromagnetic Interference Processor (e.g., Electromagnetic Interference Processor 350)

As illustrated in FIG. 3, the control processor 300 includes an electromagnetic interference processor (e.g., electromagnetic interference processor 350) configurable or configured to detect (and/or cooperate with the onboard processor 270 and/or electromagnetic interference subsystem 250 to detect) one or more electromagnetic interference signals (e.g., interference signals from the telecommunication structure 10). The electromagnetic interference processor 350 is also configurable or configured to process a measurement of signal levels of the one or more electromagnetic interference signals.

In example embodiments, the electromagnetic interference processor 350 may be configurable or configured to identify a location of a source of the electromagnetic interference signals. The electromagnetic interference processor 350 may also be configurable or configured to identify a direction of the electromagnetic interference signals. For example, the electromagnetic interference processor 350 may receive a plurality of electromagnetic interference signals when the unmanned aerial vehicle 200 is positioned at a first geolocation. The electromagnetic interference processor 350 may be configurable or configured to determine whether or not one, some or all of the electromagnetic interference signals are from the same source, area, and/or location of the telecommunication structure 10.

The electromagnetic interference processor 350 is also configurable or configured to obtain and/or generate one or more threshold signal levels for the electromagnetic interference signals. The one or more threshold signal levels may be predetermined (e.g., 700 MHz, 900 MHz, 1.8 GHz, 2.1 GHz, 2.4 GHz, 2.6 GHz, 5.8 GHz, 7 GHz, 13 GHz, 15 GHz, 18 GHz, 23 GHz, signal strength threshold less than 50 dBm) and/or dynamically determined (e.g., based on one or more of the following: the first electromagnetic interference signal, a magnitude of the first signal level, a location of a source of the first electromagnetic interference signal, and/or a direction of a source of the first electromagnetic interference signal).

In an example embodiment, the electromagnetic interference processor 350 is configurable or configured to detect and measure one or more electromagnetic interference signals when the unmanned aerial vehicle 200 is at one or more geolocations. For example, the electromagnetic interference processor 350 may detect one or more electromagnetic interference signals when the unmanned aerial vehicle 200 is at a first geolocation. Once the one or more electromagnetic interference signals are detected, the electromagnetic interference processor 350 is configurable or configured to measure signal levels of the one or more electromagnetic interference signals at the first geolocation. The electromagnetic interference processor 350 may also detect one or more electromagnetic interference signals when the unmanned aerial vehicle 200 is at a second geolocation. Once the one or more electromagnetic interference signals are detected, the electromagnetic interference processor 350 is configurable or configured to measure signal levels of the one or more electromagnetic interference signals at the second geolocation. The electromagnetic interference processor 350 may also detect one or more electromagnetic interference signals when the unmanned aerial vehicle 200 is at a third geolocation. Once the one or more electromagnetic interference signals are detected, the electromagnetic interference processor 350 is configurable or configured to measure signal levels of the one or more electromagnetic interference signals at the third geolocation. The electromagnetic interference processor 350 may also detect one or more electromagnetic interference signals when the unmanned aerial vehicle 200 is at a fourth geolocation. Once the one or more electromagnetic interference signal is detected, the electromagnetic interference processor 350 is configurable or configured to measure signal levels of the one or more electromagnetic interference signals at the fourth geolocation. And so on.

The Navigation Processor (e.g., the Navigation Processor 360)

As illustrated in FIG. 3, the control processor 300 includes a navigation processor (e.g., navigation processor 360) configurable or configured to control movements of the unmanned aerial vehicle 200 so as to navigate, position, orientate, and/or direct the unmanned aerial vehicle 200 to a desired position, geolocation, destination, orientation, and/or direction. The navigation processor 360 may communicate with a Global Positioning System (GPS) or any other Global Navigation Satellite System (GNSS) based navigation device. The navigation processor 360 is also configurable or configured to be in communication with the onboard processor 270 and/or navigation subsystem 260 of the unmanned aerial vehicle 200. This enables the navigation processor 360 to communicate commands, instructions, geolocation, orientation information, direction information, and/or any information related to the navigation of the unmanned aerial vehicle 200 with the onboard processor 270, other elements of the unmanned aerial vehicle, and/or one or more other elements of the system 100.

In an embodiment, the navigation processor 360 is configurable or configured to generate commands and/or information for the onboard processor 270 and/or navigation subsystem 260 to determine a route (e.g., flight path) for the unmanned aerial vehicle 200, direction for the unmanned aerial vehicle 200, orientation for the unmanned aerial vehicle 200, speed/velocity of/for the unmanned aerial vehicle 200, etc. The commands and/or information communicated between the navigation processor 360 and the onboard processor 270 and/or navigation subsystem 260 may include information pertaining to one or more flight paths, geospatial information, directions, orientation information, points of interest of the telecommunication structure 10, geolocation of destination/location of interest, and any other information related to navigating and controlling the unmanned aerial vehicle 200.

The navigation processor 360 may also generate commands and/or information (e.g., flight paths) dynamically based on the real-time and/or near real-time information gathered by one or more elements of the unmanned aerial vehicle 200 and/or system 100, including the transceiver 210, image capturing subsystem 220, object identifying subsystem 230, distance measuring subsystem 240, electromagnetic interference subsystem 250, the navigation processor 260, and/or onboard processor 270. The flight path as generated based on the information received may be a general flight path and/or an initial flight path (e.g., first flight path) for a particular session of inspection. The information received for generating the general flight path and/or first flight path includes, but is not limited to, a geolocation of the telecommunication structure 10; one or more dimensions of the telecommunication structure 10; a central axis of the telecommunication structure 10; a quantity of sections and/or levels of the telecommunication structure 10; historic information from one or more previous inspections of the telecommunication structure 10; and/or one or more points of interest of the telecommunication structure 10. The one or more points of interest of the telecommunication structure 10 may be determined from previous inspections performed on the telecommunication structure 10. This may include one or more historic locations on the telecommunication structure 10 where defects were previously identified; one or more common locations on the telecommunication structure 10 where defects are commonly identified; one or more historic locations on the telecommunication structure 10 where fixes were previously performed; one or more common locations on the telecommunication structure 10 where fixes are commonly performed; one or more historic environmental information for the geolocation of the telecommunication structure; one or more locations for undeterminable results and/or one or more current environmental information for the geolocation of the telecommunication structure.

The navigation processor 360 may also generate adjustments to initial, predetermined, and/or dynamically generated flight paths (e.g., first flight path) or subsequent flight paths (e.g., second flight path, third flight path, fourth flight path, etc.). The adjustments to flight paths may be generated in response to real-time or near real-time information, including information pertaining to the signal level of the electromagnetic interference signals processed by the electromagnetic interference subsystem 240. Additionally or alternatively, the commands and/or information may also be a new flight path generated by the navigation processor 360 in response to real-time or near real-time information on the signal level of the electromagnetic interference signal by the electromagnetic interference subsystem 240.

The Main Processor (e.g., the Main Processor 370)

As illustrated in FIG. 3, the control processor includes a main processor (e.g., main processor 370). The main processor 370 is configurable or configured to be in communication with one or more elements of the control processor 300 and/or unmanned aerial vehicle 200, and/or one or more other elements of the system 100 (e.g., databases (not shown), communication channels (not shown), information sources (not shown), etc.). For example, the main processor 370 may be in communication with the main interface 310, the image capturing processor 320, the object identifying processor 330, the distance measuring processor 340, the electromagnetic interference processor 350, and/or the navigation processor 360.

In an example embodiment, the main processor 370 is configurable or configured to perform or assist or cooperate in performing processing for one or more elements of the control processor 300 and/or unmanned aerial vehicle 200, and/or one or more other elements of the system 100.

For example, the main processor 370 is configurable or configured to process information communicated by the main interface 310. The main processor 370 is also configurable or configured to process images captured by the image capturing subsystem 220 and/or cooperate and/or assist the image capturing subsystem 220 and/or image capturing processor 320 to process images captured by the image capturing subsystem 220. Such processing of the images may include providing, estimating, extrapolating, predicting, assessing, etc., based on one or more images, one or more dimensions of the telecommunication structure 10 (e.g., height, width, etc.) (or part 10 or portion 10 of the telecommunication structure 10; or object 10 attached to, associated with, and/or secured to the telecommunication structure 10), one or more central axis/axes of the telecommunication structure 10 (or part 10 or portion 10 of the telecommunication structure 10; or object 10 attached to, associated with, and/or secured to the telecommunication structure 10), one or more sections and/or levels of the telecommunication structure 10 (or part 10 or portion 10 of the telecommunication structure 10; or object 10 attached to, associated with, and/or secured to the telecommunication structure 10), one or more orientations of the telecommunication structure 10 (or part 10 or portion 10 of the telecommunication structure 10; or object 10 attached to, associated with, and/or secured to the telecommunication structure 10), one or more of points of interests of the telecommunication structure 10 (e.g., locations of frequent defects or damages, locations of recent fixes or repairs, locations of undeterminable results, etc.) (or part 10 or portion 10 of the telecommunication structure 10; or object 10 attached to, associated with, and/or secured to the telecommunication structure 10), and/or any other information pertaining to the telecommunication structure 10 (or part 10 or portion 10 of the telecommunication structure 10; or object 10 attached to, associated with, and/or secured to the telecommunication structure 10).

As another example, the main processor 370 is configurable or configured to process information and/or cooperate and/or assist the onboard processor 270 and/or object identifying processor 330 to process information to identify one or more parts 10 or portions 10 of the telecommunication structure 10 and/or one or more objects attached to, associated with, and/or secured to the telecommunication structure 10. Such identifying may be performed by analyzing, among other things, geometries, dimensions, relative sizes, configurations, relationships, color, texture, context, shading, lighting, contrast, etc. in the images captured by the image capturing device 220; analyzing historic captured images; analyzing other information received by the transceiver 210; etc.

As another example, the main processor 370 is configurable or configured to process information from the distance measuring subsystem 240 and/or cooperate and/or assist the distance measuring subsystem 240 and/or distance measuring processor 340 to process information from the distance measuring subsystem 240 so as to determine and/or measure distances, including distances between the unmanned aerial vehicle 200 and telecommunication structure 10, one or more parts 10 or portions 10 of the telecommunication structure 10, and/or an object 10 attached to, associated with, and/or secured to the telecommunication structure 10.

As another example, the main processor 370 is configurable or configured to process information from the electromagnetic interference subsystem 250 and/or cooperate and/or assist the electromagnetic interference subsystem 250 and/or electromagnetic interference processor 350 to process information from the electromagnetic interference subsystem 250 so as to identify a location of a source of one or more electromagnetic interference signals; identify a direction of one or more electromagnetic interference signals; determine whether or not one, some or all of the electromagnetic interference signals are from the same source, area, and/or location of the telecommunication structure 10; etc.

In yet another example, the main processor 370 is configurable or configured to process information from the navigation subsystem 260 and/or cooperate and/or assist the navigation subsystem 260 and/or navigation processor 360 to process information from the navigation subsystem 260 so as to control movements of the unmanned aerial vehicle 200, including navigating, positioning, orientating, and/or directing the unmanned aerial vehicle 200 to a desired position, geolocation, destination, orientation, and/or direction.

The Reports Processor (e.g., Reports Processor 380).

As illustrated in FIG. 3, the control processor 300 includes a reports processor (e.g., reports processor 380). The reports processor 380 configurable or configured to be in communication with one or more elements of the control processor 300 and/or unmanned aerial vehicle 200, and/or one or more other elements of the system 100 (e.g., databases (not shown), communication channels (not shown), information sources (not shown), etc.). For example, the reports processor 380 may be in communication with the image capturing processor 320, the object identifying processor 330, and/or main processor 370.

In an example embodiment, the reports processor 380 is configurable or configured to receive information from the main processor 370 and/or one or more other elements of the control processor 300 for generating one or more reports on the telecommunication structure 10. For example, the reports processor 380 is configurable or configured to receive from the image capturing processor 320 and/or the main processor 370, information on the images captured by the image capturing subsystem 220. The information received, after processing by the image capturing processor 320 and/or the main processor 370, may include one or more physical damages, defects, and/or faults pertaining to the telecommunication structure 10. The information may also include geometries of each portion of the telecommunication structure 10. As another example, the reports processor 380 is also configurable or configured to receive from the object identifying processor 330 and/or the main processor 370, information on one or more parts 10 or portions 10 of the telecommunication structure 10 and/or one or more objects attached to, associated with, and/or secured to the telecommunication structure 10.

In an example embodiment, the reports processor 380 is configurable or configured to generate one or more reports on the telecommunication structure 10 based on the information received from the main processor 370 and/or one or more other elements of the control processor 300. For example, the reports processor 380 is configurable or configured to generate one or more reports on the physical or structural damages, defects and/or faults pertaining to the telecommunication structure 10. The reports processor 380 is also configurable or configured to generate one or more reports on the geometries of each portion of the telecommunication structure 10. Further, the reports processor 380 may generate a report on of each of the one or more objects identified by the object identifying subsystem 220. For example, the one or more reports as generated may report findings including, but not limited to: changes to the telecommunication structure 10, decay to one or more parts 10 or portions 10 of the telecommunication structure 10, rust to one or more parts 10 or portions 10 of the telecommunication structure 10, environmental wear and tear to one or more parts 10 or portions 10 of the telecommunication structure 10, changes or differences in the height, width, tilt, angle, any geometry changes etc. of the telecommunication structure 10, change in position, angle, etc. for the objects attached to, associated with, and/or secured to the telecommunication structure 10, presence of one or more other objects that were not previously identified and/or present, etc. Additionally or alternatively, the reports processor 380 is also configurable or configured to generate a report for proposed maintenance and/or fixing of physical damages, defects, and/or faults which were identified for the telecommunication structure 10.

Examples Embodiments of a Method for Performing Inspections on a Telecommunication Structure (e.g. Method 400)

Figure 4:
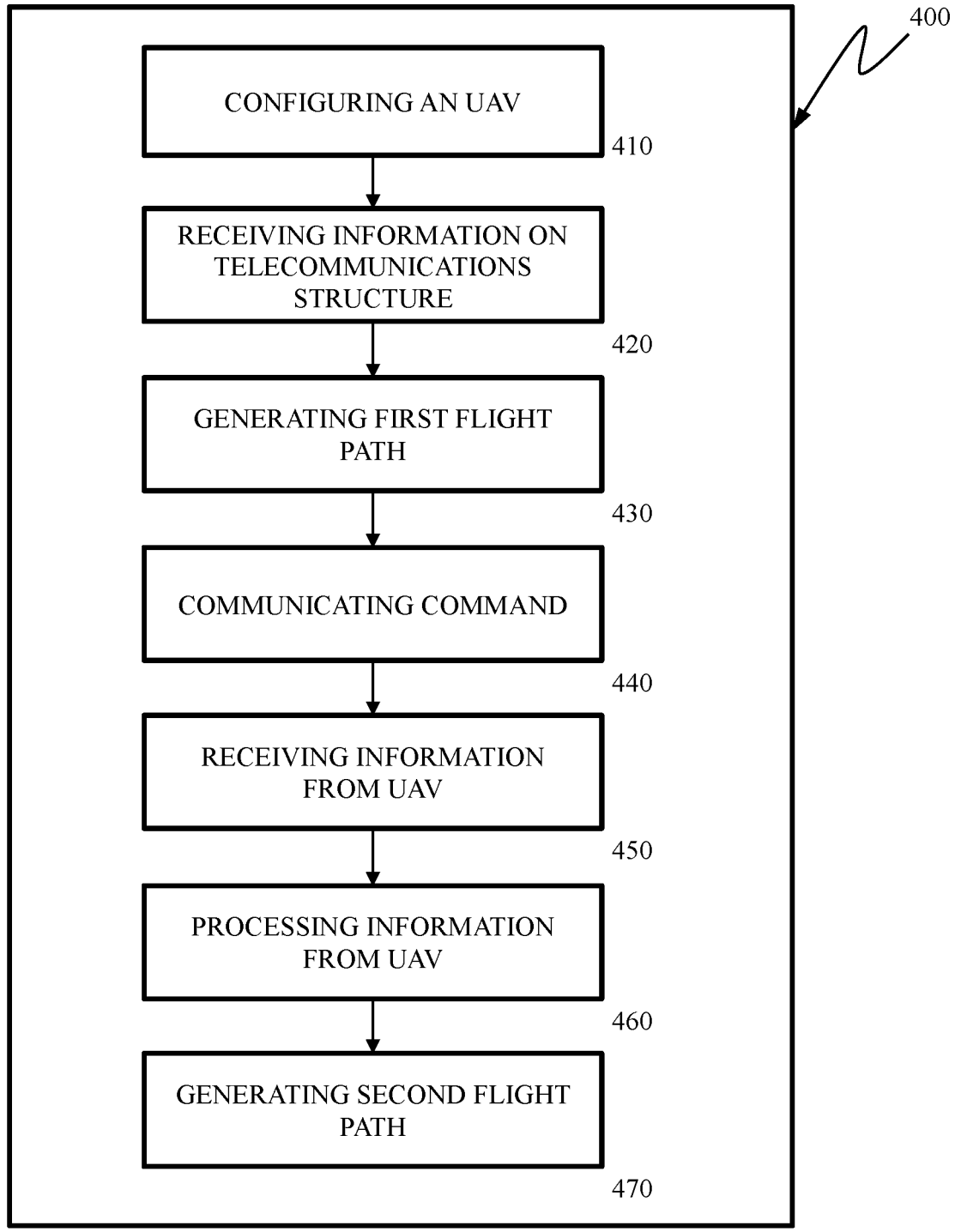
FIG. 4 is an illustration of an example embodiment of a method of performing inspections on a telecommunication structure.

FIG. 4 illustrates an example embodiment of a method (e.g., method 400) for inspecting telecommunication structures 10, parts 10 or portions 10 of telecommunication structures 10, and/or objects 10 attached to, associated with, and/or secured to the telecommunication structure 10 (and/or parts 10 or portions 10 of telecommunication structures 10 and/or objects 10 attached to, associated with, and/or secured to the telecommunication structure 10). One or more actions of method 400 may be performed by one or more elements of the subsystems and/or processors, as described in the present disclosure.

In an example embodiment, the method 400 provides a method for performing an inspection of a telecommunication structure 10, parts 10 or portions 10 of telecommunication structures 10, and/or any objects attached to, associated with, and/or secured to the telecommunication structure 10 via example embodiments of an unmanned aerial vehicle (e.g., unmanned aerial vehicle 200) and example embodiments of a control processor (e.g., control processor 300). The method 400 includes configuring an unmanned aerial vehicle 200 (e.g., action 410). The unmanned aerial vehicle 200 is configurable or configured to cooperate with one or more control processors 300 to inspect one or more telecommunication structures 10, one or more parts 10 or portions 10 of telecommunication structures 10, and/or objects that are attached to, associated with, and/or secured to telecommunication structures 10. The unmanned aerial vehicle 200 is provided with one or more elements to perform the functions and/or processes as described above and in the present disclosure. For example, the unmanned aerial vehicle 200 may include one or more image capturing subsystems 220. The one or more image capturing subsystems 220 is configurable or configured to capture images of the telecommunication structure 10. The unmanned aerial vehicle 200 may also include one or more electromagnetic interference subsystems 250. The one or more electromagnetic interference subsystems 250 is configurable or configured to detect electromagnetic interference signals. The unmanned aerial vehicle 200 may also include one or more navigation subsystems 260. The one or more navigation subsystems 260 is configurable or configured to control movements of the unmanned aerial vehicle 200. In another embodiment, the unmanned aerial vehicle 200 may further include one or more object identifying subsystem 230 and/or one or more distance measuring subsystem 240. The one or more object identifying subsystem 230 is configurable or configured to identify geometries of one or more objects identified in the images captured by the image capturing subsystem 210. The one or more distance measuring subsystem 240 is configurable or configured to measure distances between the unmanned aerial vehicle 200 and the one or more objects in the images captured by the image capturing device 210.

The method 400 further includes receiving, by a control processor 300, information pertaining to the telecommunication structure 10 being inspected (e.g., action 420). Such information may include a geolocation of the telecommunication structure 10, one or more dimensions of the telecommunication structure 10; a central axis of the telecommunication structure 10, a quantity of sections and/or levels of the telecommunication structure 10, historic information from one or more previous inspections of the telecommunication structure 10, and/or one or more points of interest of the telecommunication structure 10. The one or more points of interest of the telecommunication structure 10 may be determined from previous inspections performed on the telecommunication structure 10. This may include one or more historic locations on the telecommunication structure 10 where defects were previously identified, one or more common locations on the telecommunication structure 10 where defects are commonly identified, one or more historic locations on the telecommunication structure 10 where fixes were previously performed, one or more common locations on the telecommunication structure 10 where fixes are commonly performed, one or more historic environmental information for the geolocation of the telecommunication structure, one or more locations for undeterminable results and/or one or more current environmental information for the geolocation of the telecommunication structure. Additionally or alternatively, the information received may also include environmental information for an area that includes the telecommunication structure 10. Examples of environmental information, real-time or historic, may include but not limited to: temperature, wind conditions, relative humidity, rain, heat, etc. The method 400 further includes generating, by the control processor 300, a first flight path (e.g., action 430). The first flight path may be generated based on one or more information pertaining to the telecommunication structure 10 as described above and in the present disclosure.

The method 400 further includes communicating, to the navigation subsystem 260, one or more commands for the navigation subsystem 260 to control movements of the unmanned aerial vehicle 200 from an initial start position along the first flight path (e.g., action 440). The first flight path includes a first geolocation along the first flight path. The commands communicated to the navigation subsystem 260 may include information pertaining to one or more flight paths, one or more geospatial information, one or more directions, one or more orientation information, one or more points of interest of the telecommunication structure 10, one or more geolocations of destination/location of interest, and any other information related to navigating and/or controlling the unmanned aerial vehicle 200.

The method 400 further includes receiving, in real-time, information from the unmanned aerial vehicle 200 (e.g., action 450) at the first geolocation. The information may include measurements of signal levels of one or more electromagnetic interference signals measured by the electromagnetic interference subsystem 250 at a first geolocation. The electromagnetic interference subsystem 250 detects one or more electromagnetic interference signals when the unmanned aerial vehicle 200 is at a first geolocation. Once the one or more electromagnetic interference signals are detected, the electromagnetic interference subsystem 250 then measures a first signal level of a first electromagnetic interference signal. The method 400 may also receive, from the electromagnetic interference subsystem 250, a location source of a location of a source and a direction of the electromagnetic interference signals; and a location source of a location of a source and a direction of the first electromagnetic interference signals. Further, the method 400 includes receiving, by the control processor 300, information on a first image captured by the image capturing subsystem 220 when the unmanned aerial vehicle 200 is at a first geolocation. For example, the first image as captured by the image capturing subsystem 220 at the first geolocation may include the entire telecommunication structure 10, a first portion 10 of the telecommunication structure 10, and/or an object 10 attached to, associated with, and/or secured to the telecommunication structure 10. The method 400 also includes receiving, by the control processor 300, information on a first geometry of a first object identified by the object identifying subsystem 230, and a first distance between the unmanned aerial vehicle 200 and the first object identified when the unmanned aerial vehicle 200 is at a first geolocation.

The method 400 further includes processing, in real-time, the information received from the unmanned aerial vehicle 200 (e.g., action 460). Such processing may include comparing the first signal level of the first electromagnetic interference signal at the first geolocation with a threshold signal level. The threshold signal method level in method 400 may be determined based on one or more, but not limited to: the first electromagnetic interference signal, a location of a source of the first electromagnetic interference signal; and/or a direction of a source of the first electromagnetic interference signal. In response to a determination that the first signal level of the first electromagnetic interference signal is greater than or equal to the threshold signal level, the processing may include performing several further processing.

The method 400 further includes generating a second flight path (e.g., action 470) in response to a determination that the first signal level of the first electromagnetic interference signal is greater than or equal to the threshold signal level. The second flight path is generated in response to the equal or higher than threshold signal level, includes an adjustment to the first flight path and including a second geolocation along the second flight path. The second geolocation is different from the first geolocation. The second geolocation is determined by estimating the signal level measurement at the second geolocation based on the first signal level of the first electromagnetic signal that was measured at the first geolocation. The second flight path may be an adjustment to the second flight path. Such adjustments may include an adjustment to the general flight path (e.g., change in movements for the unmanned aerial vehicle 200, change in flight patterns, etc.); an adjustment to a separation distance between the unmanned aerial vehicle 200 and the telecommunication structure 10 (e.g., to avoid electromagnetic signal interference, etc.); an adjustment to a quantity of levels of the telecommunication structure 10 to inspect; and/or an adjustment to one or more points of interest of the telecommunication structure 10. The response also includes communicating, to the navigation subsystem 260, a command for the navigation subsystem 260 to reposition the unmanned aerial vehicle 200 from the first geolocation to the second geolocation.

The response also includes receiving, in real-time, information from the onboard processor 270. The information from the onboard processor 270 includes a second signal level of the first electromagnetic interference signal measured by the electromagnetic interference subsystem 250 when the unmanned aerial vehicle 200 is at the second geolocation. The response further includes comparing the second signal level of the first electromagnetic interference signal with the threshold signal level to determine if the second signal level of the first electromagnetic interference signal at the second geolocation is greater than or equal to a threshold signal level. Further, the method 400 includes receiving, by the control processor 300, information on a second image captured by the image capturing subsystem 220 when the unmanned aerial vehicle 200 is at a second geolocation. For example, the second image as captured by the image capturing subsystem 220 at the second geolocation may include the entire telecommunication structure 10, the first portion 10 of the telecommunication structure 10, and/or an object 10 attached to, associated with, and/or secured to the telecommunication structure 10. The method 400 also includes receiving, by the control processor 300, information on a second geometry of the first object identified by the object identifying subsystem 230 and, a second distance between the unmanned aerial vehicle 200 and the first object identified when the unmanned aerial vehicle 200 is at the second geolocation.

In example embodiments when the method 400 determines that the second signal level of the first electromagnetic interference at the second geolocation is equal or higher than the threshold signal level, the method 400 may generate a third flight path in response to the determination. The third flight path, generated in response to the equal or higher than threshold signal level, includes an adjustment to the second flight path and including a third geolocation along the third flight path. The third geolocation is different from the first and second geolocation. The third geolocation is determined by estimating the signal level measurement at the second geolocation based on the second signal level of the first electromagnetic signal that was measured at the second geolocation. The third flight path may be an adjustment to the second flight path. Such adjustments may include an adjustment to the general flight path (e.g., change in movements for the unmanned aerial vehicle 200, change in flight patterns, etc.); an adjustment to a separation distance between the unmanned aerial vehicle 200 and the telecommunication structure 10 (e.g., to avoid electromagnetic signal interference, etc.); an adjustment to a quantity of levels of the telecommunication structure 10 to inspect; and/or an adjustment to one or more points of interest of the telecommunication structure 10. The response also includes communicating, to the navigation subsystem 260, a command for the navigation subsystem 260 to reposition the unmanned aerial vehicle 200 from the second geolocation to the third geolocation.

The response also includes receiving, in real-time, information from the onboard processor 270. The information from the onboard processor 270 includes a third signal level of the first electromagnetic interference signal measured by the electromagnetic interference subsystem 250 when the unmanned aerial vehicle 200 is at the third geolocation. The response further includes comparing the third signal level of the first electromagnetic interference signal with the threshold signal level to determine if the third signal level of the first electromagnetic interference signal at the third geolocation is greater than or equal to a threshold signal level. In response to a determination that the third signal level of the first electromagnetic interference signal is less than the threshold signal level, the method 400 communicates a command to the navigation subsystem 260 to control the unmanned aerial vehicle 200 along the third flight path. Further, the method 400 includes receiving, by the control processor 300, a third image captured by the image capturing subsystem 220 when the unmanned aerial vehicle 200 is at a third geolocation. For example, the third image as captured by the image capturing subsystem 220 at the third geolocation may include the entire telecommunication structure 10, a first, second, or third portion 10 of the telecommunication structure 10, and/or an object 10 attached to, associated with, and/or secured to the telecommunication structure 10. The method 400 also includes receiving, by the control processor 300, information on a third geometry of the first object identified by the object identifying subsystem 230 and a third distance between the unmanned aerial vehicle 200 and the first object identified when the unmanned aerial vehicle 200 is at the third geolocation.

The method 400 includes processing of images captured by the image capturing subsystem 220. The captured images processed by the image capturing processor 320 may include, but are not limited to, images of the telecommunication structure 10, one or more parts 10 or portions 10 of the telecommunication structure 10, and/or one or more objects 10 that are attached to, associated with, and/or secured to the telecommunication structure 10. The processing of the images (e.g., first image, second image, third image, etc.) provides one or more physical damages, defects, and/or faults pertaining to the telecommunication structure 10 to be identified. The processing of the images (e.g., first image, second image, third image, etc.) also provides geometries of each portion of the telecommunication structure 10 to be determined. The method 400 also includes generating one or more reports on the telecommunication structure 10. For example, the reports generated may include one or more reports on the physical or structural damages, defects and/or faults pertaining to the telecommunication structure 10. The reports may also include one or more reports on the geometries of each portion of the telecommunication structure 10. Further, the method 400 may generate one or more reports on each of the one or more objects identified by the object identifying subsystem 220. For example, the one or more reports may report findings including, but not limited to: changes to the telecommunication structure 10; decay to one or more parts 10 or portions 10 of the telecommunication structure 10; rust to one or more parts 10 or portions 10 of the telecommunication structure 10; environmental wear and tear to one or more parts 10 or portions 10 of the telecommunication structure 10; changes or differences in the height, width, tilt, angle, any geometry changes, etc. of the telecommunication structure 10; change in position, angle, etc. for the objects attached to, associated with, and/or secured to the telecommunication structure 10; presence of one or more other objects that were not previously identified and/or present, etc. Additionally or alternatively, the one or more reports may be proposed maintenance and/or fixing of physical damages, defects, and/or faults which were identified for the telecommunication structure 10.

Additionally or alternatively, the method 400 may further include receiving, in-real time, a first signal level of a second electromagnetic interference signal in addition to a first signal level of a first electromagnetic interference signal when the unmanned aerial vehicle 200 is at the first geolocation. When both signals are detected and received, the method 400 further includes processing both signals. Such processing may also include comparing the first signal level of the second electromagnetic interference signal at the first geolocation with a second threshold signal level. In response to a determination that the first signal level of the second electromagnetic interference signal is greater than or equal to the second threshold signal level and also the first signal level of the first electromagnetic interference signal is greater than or equal to the threshold signal level, the method 400 further includes generating a fourth flight path. The threshold signal level is different from the second threshold signal level. The second threshold signal level may be determined based on one or more, but not limited to the first electromagnetic interference signal, a location of a source of the first electromagnetic interference signal; and/or a direction of a source of the first electromagnetic interference signal. The generated fourth flight path is an adjustment to the first flight path and includes a fourth geolocation along the fourth flight path. The fourth geolocation is different from the first geolocation and the second geolocation. The fourth geolocation is determined by estimating the signal level measurement at the fourth geolocation based on the first signal level of the first electromagnetic signal and the first signal level of the second electromagnetic signal that was measured at the first geolocation. The fourth flight path may be an adjustment to the first flight path. Such adjustments may include an adjustment to the general flight path (e.g., movements of the unmanned aerial vehicle; an adjustment to a separation distance between the unmanned aerial vehicle 200 and the telecommunication structure 10 (e.g., to avoid electromagnetic signal interference), an adjustment to a quantity of levels of the telecommunication structure 10 to inspect, and/or an adjustment to one or more points of interest. The response also includes communicating, to the navigation subsystem 260, a command for the navigation subsystem 260 to reposition the unmanned aerial vehicle 200 from the first geolocation to the fourth geolocation. The response also includes receiving, in real-time, information from the onboard processor 270. The information from the onboard processor 270 includes a fourth signal level of the first electromagnetic interference signal measured by the electromagnetic interference subsystem 250 when the unmanned aerial vehicle 200 is at the fourth geolocation. The response further includes comparing the fourth signal level of the first electromagnetic interference signal with the second threshold signal level to determine whether the fourth signal level of the first electromagnetic interference signal at the fourth geolocation is greater than or equal to a threshold signal level.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art" depends on the context in which that term is used. Such terms are to be construed in light of the context in which they are used in the present disclosure and as one of ordinary skill in the art would understand those terms in the disclosed context. The above definitions are not exclusive of other meanings that might be imparted to those terms based on the disclosed context.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

The invention claimed is:
1. A system for performing inspections of a telecommunication structure, the system comprising:
an unmanned aerial vehicle, the unmanned aerial vehicle including:
an image capturing subsystem, the image capturing subsystem configured to capture images;
an object identifying subsystem, the object identifying subsystem configured to identify geometries of one or more objects in the images captured by the image capturing device;
a distance measuring subsystem, the distance measuring subsystem configured to measure distances between the unmanned aerial vehicle and the one or more objects in the images captured by the image capturing device;
a navigation subsystem, the navigation subsystem configured to control movements of the unmanned aerial vehicle;
an electromagnetic interference subsystem, the electromagnetic interference subsystem configured to detect electromagnetic interference signals, wherein when the electromagnetic interference subsystem detects one or more electromagnetic interference signals, the electromagnetic interference subsystem is configured to measure signal levels of the one or more electromagnetic interference signals; and
an onboard processor, the onboard processor in communication with the image capturing subsystem, the object identifying subsystem, the distance measuring subsystem, the navigation subsystem, and the electromagnetic interference subsystem; and
a control processor, the control processor in communication with the onboard processor, the control processor configured to:
communicate, to the navigation subsystem, a command for the navigation subsystem to control movements of the unmanned aerial vehicle from an initial start position along a first flight path, the first flight path including a first geolocation along the first flight path;
receive, in real-time, information from the onboard processor including:
images captured by the image capturing subsystem, including a first image captured by the image capturing subsystem when the unmanned aerial vehicle is at the first geolocation, the first image including an image of a first portion of the telecommunication structure;
geometries of one or more objects identified by the object identifying subsystem, including a first geometry of a first object identified by the object identifying subsystem when the unmanned aerial vehicle is positioned at the first geolocation;
distances measured by the distance measuring subsystem, including a first distance between the unmanned aerial vehicle and the first object when the unmanned aerial vehicle is at the first geolocation; and
signal levels of one or more electromagnetic interference signals measured by the electromagnetic interference subsystem, including a first signal level of a first electromagnetic interference signal measured by the electromagnetic interference subsystem when the unmanned aerial vehicle is at the first geolocation; and
process, in real-time, the information received from the onboard processor, the processing including:
comparing the first signal level of the first electromagnetic interference signal with a dynamically-generated threshold signal level, the dynamically-generated threshold signal level generated based on a real-time measurement, from the first geolocation, of: the first signal level of the first electromagnetic interference signal, a location of a source of the first electromagnetic interference signal, and a direction of the first electromagnetic interference signal; and responsive to a determination that the first signal level of the first electromagnetic interference signal is greater than or equal to the dynamically-generated threshold signal level:

generating a second flight path, the second flight path being an adjustment to the first flight path, including a repositioning of the unmanned aerial vehicle from the first geolocation to a second geolocation based on the comparison of the first signal level of the first electromagnetic signal with the dynamically-generated threshold signal level, the second geolocation being different from the first geolocation;

communicating, to the navigation subsystem, a command for the navigation subsystem to reposition the unmanned aerial vehicle from the first geolocation to the second geolocation;

receiving, in real-time from the onboard processor:

a second image captured by the image capturing subsystem when the unmanned aerial vehicle is at the second geolocation, the second image including an image of the first portion of the telecommunication structure;

a second geometry of the first object identified by the object identifying subsystem when the unmanned aerial vehicle is positioned at the second geolocation;

a second distance between the unmanned aerial vehicle and the first object identified by the object identifying subsystem when the unmanned aerial vehicle is at the second geolocation; and a second signal level of the first electromagnetic interference signal measured by the electromagnetic interference subsystem when the unmanned aerial vehicle is at the second geolocation; and comparing the second signal level of the first electromagnetic interference signal with the a second dynamically-generated threshold signal level, the second dynamically-generated threshold signal level being different from the first dynamically-generated threshold signal level.

2. A system for performing inspections of a telecommunication structure, the system comprising:

an unmanned aerial vehicle, the unmanned aerial vehicle including:

an image capturing subsystem, the image capturing subsystem configured to capture images;

a navigation subsystem, the navigation subsystem configured to control movements of the unmanned aerial vehicle;

an electromagnetic interference subsystem, the electromagnetic interference subsystem configured to detect electromagnetic interference signals, wherein when the electromagnetic interference subsystem detects one or more electromagnetic interference signals, the electromagnetic interference subsystem is configured to measure signal levels of the one or more electromagnetic interference signals; and an onboard processor, the onboard processor in communication with the image capturing subsystem, the navigation subsystem, and the electromagnetic interference subsystem; and a control processor, the control processor in communication with the onboard processor, the control processor configured to:

communicate, to the navigation subsystem, a command for the navigation subsystem to control movements of the unmanned aerial vehicle from an initial start position along a first flight path, the first flight path including a first geolocation along the first flight path;

receive, in real-time, information from the onboard processor including:

signal levels of one or more electromagnetic interference signals measured by the electromagnetic interference subsystem, including a first signal level of a first electromagnetic interference signal measured by the electromagnetic interference subsystem when the unmanned aerial vehicle is at the first geolocation; and process, in real-time, the information received from the onboard processor, the processing including:

comparing the first signal level of the first electromagnetic interference signal with a dynamically-generated threshold signal level, the dynamically-generated threshold signal level generated based on a real-time measurement, from the first geolocation, of: the first signal level of the first electromagnetic interference signal, a location of a source of the first electromagnetic interference signal, and a direction of the first electromagnetic interference signal; and responsive to a determination that the first signal level of the first electromagnetic interference signal is greater than or equal to the dynamically-generated threshold signal level:

generating a second flight path, the second flight path being an adjustment to the first flight path, including a repositioning of the unmanned aerial vehicle from the first geolocation to a second geolocation based on the comparison of the first signal level of the first electromagnetic signal with the dynamically-generated threshold signal level, the second geolocation being different from the first geolocation;

communicating, to the navigation subsystem, a command for the navigation subsystem to reposition the unmanned aerial vehicle from the first geolocation to the second geolocation;

receiving, in real-time from the onboard processor:

a second signal level of the first electromagnetic interference signal measured by the electromagnetic interference subsystem when the unmanned aerial vehicle is at the second geolocation; and comparing the second signal level of the first electromagnetic interference signal with the a second dynamically-generated threshold signal level, the second dynamically-generated threshold signal level being different from the first dynamically-generated threshold signal level.

3. The system of claim 2, wherein the unmanned aerial vehicle further includes:

an object identifying subsystem, the object identifying subsystem configured to identify geometries of one or more objects in the images captured by the image capturing device; and a distance measuring subsystem, the distance measuring subsystem configured to measure distances between the unmanned aerial vehicle and the one or more objects in the images captured by the image capturing device;

wherein the onboard processor is in communication with the object identifying subsystem and the distance measuring subsystem.

4. The system of claim 2, wherein the control processor is further configured to:

responsive to a determination, by the control processor, that the second signal level of the first electromagnetic interference signal is less than the threshold signal level:

communicate, to the navigation subsystem, a command for the navigation subsystem to control movements of the unmanned aerial vehicle from the second geolocation along the second flight path.

5. The system of claim 2, wherein when the unmanned aerial vehicle is positioned at the first geolocation, the control processor is configured to:
receive a first image captured by the image capturing subsystem at the first geolocation, the first image including an image of a first portion of the telecommunication structure.

6. The system of claim 3, wherein when the unmanned aerial vehicle is positioned at the first geolocation, the control processor is configured to:
receive a first image captured by the image capturing subsystem at the first geolocation, the first image including an image of a first portion of the telecommunication structure;
receive a first geometry of a first object identified by the object identifying subsystem when the unmanned aerial vehicle is positioned at the first geolocation; and
receive a first distance between the unmanned aerial vehicle and the first object identified by the object identifying subsystem when the unmanned aerial vehicle is at the first geolocation.

7. The system of claim 5, wherein when the unmanned aerial vehicle is positioned at the second geolocation, the control processor is configured to:
receive a second image captured by the image capturing subsystem at the second geolocation, the second image including an image of the first portion of the telecommunication structure.

8. The system of claim 6, wherein when the unmanned aerial vehicle is positioned at the second geolocation, the control processor is configured to:
receive a second image captured by the image capturing subsystem at the second geolocation, the second image including an image of the first portion of the telecommunication structure;
receive a second geometry of the first object identified by the object identifying subsystem when the unmanned aerial vehicle is positioned at the second geolocation;
receive a second distance between the unmanned aerial vehicle and the first object identified by the object identifying subsystem when the unmanned aerial vehicle is at the second geolocation.

9. The system of claim 3, wherein the control processor is further configured to:
responsive to a determination, by the control processor, that the second signal level of the first electromagnetic interference signal is greater than or equal to the threshold signal level:
generate a third flight path, the third flight path being an adjustment to the second flight path, including a repositioning of the unmanned aerial vehicle from the second geolocation to a third geolocation based on the second signal level of the first electromagnetic signal, the third geolocation being different from the first and second geolocations;
communicate, to the navigation subsystem, a command for the navigation subsystem to move the unmanned aerial vehicle from the second geolocation to the third geolocation;
receive, in real-time from the onboard processor:
a third image captured by the image capturing subsystem when the unmanned aerial vehicle is at the third geolocation, the third image including an image of the first portion of the telecommunication structure;
a third geometry of the first object identified by the object identifying subsystem when the unmanned aerial vehicle is positioned at the third geolocation;
a third distance between the unmanned aerial vehicle and the first object identified by the object identifying subsystem when the unmanned aerial vehicle is at the third geolocation; and
a third signal level of the first electromagnetic interference signal measured by the electromagnetic interference subsystem when the unmanned aerial vehicle is at the third geolocation.

10. The system of claim 9, wherein the control processor is further configured to:
compare the third signal level of the first electromagnetic interference signal with the threshold signal level; and
responsive to a determination, by the control processor, that the third signal level of the first electromagnetic interference signal is less than the threshold signal level:
communicate, to the navigation subsystem, a command for the navigation subsystem to control movements of the unmanned aerial vehicle from the third geolocation along the third flight path.

11. The system of claim 2, wherein the images captured by the image capturing subsystem include video images.

12. The system of claim 8, wherein one or more of the following apply:
the first geometry of the first object is proportional to the second geometry of the first object; and/or
the geometries of the one or more objects identified by the object identifying subsystem include information pertaining to dimensions and/or shapes of the one or more objects identified by the object identifying subsystem.

13. The system of claim 2, wherein the one or more objects identified by the object identifying subsystem include:
one or more portions or parts of the telecommunication structure; and/or
one or objects attached or secured to the telecommunication structure.

14. The system of claim 2, wherein the electromagnetic interference subsystem is further configured to:
identify a location of a source of the electromagnetic interference signals; and/or
identify a location of a source of the first electromagnetic interference signal; and/or
identify a direction of the electromagnetic interference signals; and/or
identify a direction of the first electromagnetic interference signal.

15. The system of claim 2, wherein the control processor is configured to generate the first flight path based on one or more of the following:
a geolocation of the telecommunication structure; and/or
one or more dimensions of the telecommunication structure; and/or
a central axis of the telecommunication structure; and/or
a quantity of sections and/or levels of the telecommunication structure; and/or
historic information from one or more previous inspections of the telecommunication structure; and/or
one or more points of interest of the telecommunication structure, including one or more of the following:

one or more historic locations on the telecommunication structure where defects were previously identified; and/or one or more common locations on the telecommunication structure where defects are commonly identified; and/or one or more historic locations on the telecommunication structure where fixes were previously performed; and/or one or more common locations on the telecommunication structure where fixes are commonly performed; and/or one or more historic environmental information for the geolocation of the telecommunication structure; and/or one or more current environmental information for the geolocation of the telecommunication structure.

16. The system of claim 2, wherein the control processor is configured to generate the second flight path by determining the second geolocation as a location where:

a signal level measurement performed by the electromagnetic interference subsystem is estimated to be less than the threshold signal level; and/or a signal level measurement performed by the electromagnetic interference subsystem is estimated to be less than the first signal level.

17. The system of claim 16, wherein the control processor is configured to determine the second geolocation by estimating the signal level measurement at the second geolocation based on the first signal level measured at the first geolocation.

18. The system of claim 2, wherein the adjustments to the first flight path that result in the second flight path include one or more of the following:

adjustments to a separation distance between the unmanned aerial vehicle and the telecommunication structure;

adjustments to a quantity of levels of the telecommunication structure to inspect; and/or adjustments to one or more points of interest.

19. The system of claim 8, wherein the control processor is further configured to process the second image captured by the image capturing subsystem to:

identify physical damages, defects, and/or faults pertaining to the telecommunication structure; and determine the geometries of each portion of the telecommunication structure.

20. The system of claim 19, wherein the control processor is further configured to generate one or more of the following reports:

a report of the identified physical damages, defects, and/or faults pertaining to the telecommunication structure; and/or a report of the geometries of each portion of the telecommunication structure; and/or a report of the geometries of each of the one or more objects identified by the object identifying subsystem; and/or a report for proposed maintenance and/or fixing of physical damages, defects, and/or faults identified for the telecommunication structure.

21. The system of claim 2, wherein the control processor is further configured to receive, in real-time, a first signal level of a second electromagnetic interference signal measured by the electromagnetic interference subsystem when the unmanned aerial vehicle is at the first geolocation;

wherein the processing, by the control processor, further includes:

responsive to a determination that the first signal level of the first electromagnetic interference signal and the first signal level of the second electromagnetic interference signal are received by the control processor:

comparing the first signal level of the second electromagnetic interference signal with a second threshold signal level; and responsive to a determination that (1) the first signal level of the second electromagnetic interference signal is greater than or equal to the second threshold signal level, and (2) the first signal level of the first electromagnetic interference signal is greater than or equal to the threshold signal level:

generating a fourth flight path, the fourth flight path being an adjustment to the first flight path, including a repositioning of the unmanned aerial vehicle from the first geolocation to a fourth geolocation based on the first signal level of the first electromagnetic signal and the first signal level of the second electromagnetic signal, the fourth geolocation being different from the first geolocation and the second geolocation;

communicating, to the navigation subsystem, a command for the navigation subsystem to reposition the unmanned aerial vehicle from the first geolocation to the fourth geolocation;

receiving, in real-time from the onboard processor:

a fourth signal level of the first electromagnetic interference signal measured by the electromagnetic interference subsystem when the unmanned aerial vehicle is at the fourth geolocation; and comparing the fourth signal level of the first electromagnetic interference signal with the second threshold signal level.

22. The system of claim 21, wherein one or more of the following apply:

the first threshold signal level is different from the second threshold signal level; and/or the control processor is configured to determine the fourth geolocation by estimating the signal level measurement at the fourth geolocation based on the first signal level of the first electromagnetic interference signal measured at the first geolocation and the first signal level of the second electromagnetic interference signal measured at the first geolocation.

23. A method for performing inspections of a telecommunication structure, the method comprising:

configuring an unmanned aerial vehicle, the unmanned aerial vehicle including:

an image capturing subsystem, the image capturing subsystem configured to capture images;

a navigation subsystem, the navigation subsystem configured to control movements of the unmanned aerial vehicle; and an electromagnetic interference subsystem, the electromagnetic interference subsystem configured to detect electromagnetic interference signals, wherein when the electromagnetic interference subsystem detects one or more electromagnetic interference signals, the electromagnetic interference subsystem is configured to measure signal levels of the one or more electromagnetic interference signals;

receiving, by a control processor, information pertaining to the telecommunication structure being inspected;

generating, by the control processor, a first flight path, the first flight path generated based on the received information pertaining to the telecommunication structure;

communicating, to the navigation subsystem, a command for the navigation subsystem to control movements of the unmanned aerial vehicle from an initial start position along the first flight path, the first flight path including a first geolocation along the first flight path;

receiving, in real-time, information from the unmanned aerial vehicle including:

measurements of signal levels of one or more electromagnetic interference signals measured by the electromagnetic interference subsystem, including a first signal level of a first electromagnetic interference signal measured by the electromagnetic interference subsystem when the unmanned aerial vehicle is at the first geolocation; and processing, in real-time, the information received from the unmanned aerial vehicle, the processing including:

comparing the first signal level of the first electromagnetic interference signal with a dynamically-generated threshold signal level, the dynamically-generated threshold signal level generated based on a real-time measurement, from the first geolocation, of: the first signal level of the first electromagnetic interference signal, a location of a source of the first electromagnetic interference signal, and a direction of the first electromagnetic interference signal; and responsive to a determination that the first signal level of the first electromagnetic interference signal is greater than or equal to the dynamically-generated threshold signal level:

generating a second flight path, the second flight path being an adjustment to the first flight path, including a repositioning of the unmanned aerial vehicle from the first geolocation to a second geolocation based on the comparison of the first signal level of the first electromagnetic signal with the dynamically-generated threshold signal level, the second geolocation being different from the first geolocation;

communicating, to the navigation subsystem, a command for the navigation subsystem to reposition the unmanned aerial vehicle from the first geolocation to the second geolocation;

receiving, in real-time from the onboard processor:

a second signal level of the first electromagnetic interference signal measured by the electromagnetic interference subsystem when the unmanned aerial vehicle is at the second geolocation; and comparing the second signal level of the first electromagnetic interference signal with the a second dynamically-generated threshold signal level, the second dynamically-generated threshold signal level being different from the first dynamically-generated threshold signal level.

* * * * *